United States Patent
Shau et al.

(10) Patent No.: US 10,310,911 B2
(45) Date of Patent: Jun. 4, 2019

(54) SOLVER FOR CLUSTER MANAGEMENT SYSTEM

(71) Applicant: GOOGLE LLC, Mountain View, CA (US)

(72) Inventors: Albert Yen Shau, Sunnyvale, CA (US); Christopher Gianelloni, Santa Clara, CA (US); Derek Lewis Wood, Sunnyvale, CA (US); Jonathan Michael Gray, Hermosa Beach, CA (US); Nitin Motgi, Santa Clara, CA (US); Poorna Chandra Gowda Bannikkuppe Ramachandra, San Mateo, CA (US); Rohit Sarma Nistala, Torrance, CA (US)

(73) Assignee: Google LLC, Mountain View, CA (US)

( * ) Notice: Subject to any disclaimer, the term of this patent is extended or adjusted under 35 U.S.C. 154(b) by 429 days.

(21) Appl. No.: 14/657,592

(22) Filed: Mar. 13, 2015

(65) Prior Publication Data

US 2015/0264119 A1 Sep. 17, 2015

Related U.S. Application Data

(60) Provisional application No. 61/953,106, filed on Mar. 14, 2014.

(51) Int. Cl.
*G06F 9/50* (2006.01)
*G06F 9/48* (2006.01)
(Continued)

(52) U.S. Cl.
CPC .......... *G06F 9/5088* (2013.01); *G06F 9/4881* (2013.01); *H04L 67/10* (2013.01);
(Continued)

(58) Field of Classification Search
None
See application file for complete search history.

(56) References Cited

U.S. PATENT DOCUMENTS 6,801,937 B1 10/2004 Novaes et al.
6,807,557 B1 10/2004 Novaes et al.
(Continued)

OTHER PUBLICATIONS

U.S. Appl. No. 14/657,786, Planner For Cluster Management System, filed Mar. 13, 2015.
(Continued)

*Primary Examiner* — Nicholas R Taylor
*Assistant Examiner* — Christopher B Robinson
(74) *Attorney, Agent, or Firm* — Lowenstein Sandler LLP

(57) ABSTRACT

A processing device receives a first cluster management operation request, wherein the first cluster management operation request is for a deployment operation of a first cluster and comprises a cluster template, a specified number of nodes to deploy and a configuration. The processing device determines a plurality of constraints from at least one of the cluster template or the configuration. The processing device deterministically solves for and outputs a first cluster layout comprising the specified number of nodes, each of the specified number of nodes comprising a hardware type, an image type and one or more services, wherein the first cluster layout satisfies the plurality of constraints.

21 Claims, 17 Drawing Sheets

(51) Int. Cl.
    *H04L 29/08*    (2006.01)
    *H04L 29/06*    (2006.01)
    *H04L 29/14*    (2006.01)
(52) U.S. Cl.
    CPC .......... *H04L 67/1002* (2013.01); *H04L 67/42* (2013.01); *H04L 69/40* (2013.01)

(56) References Cited

U.S. PATENT DOCUMENTS

| | | |
|---|---|---|
| 6,847,993 B1 | 1/2005 | Novaes et al. |
| 6,973,473 B1 | 12/2005 | Novaes et al. |
| 7,120,690 B1 | 10/2006 | Krishnan et al. |
| 8,543,800 B2 | 9/2013 | Arditti et al. |
| 8,635,618 B2 | 1/2014 | Aggarwal et al. |
| 8,706,852 B2 | 4/2014 | Kunze et al. |
| 8,819,200 B2 | 8/2014 | Johnson |
| 9,426,030 B1* | 8/2016 | Anerousis ........... H04L 41/0859 |
| 2002/0052941 A1* | 5/2002 | Patterson .............. G06F 9/5061 709/223 |
| 2002/0091752 A1 | 7/2002 | Firlie |
| 2002/0116453 A1 | 8/2002 | Todorov et al. |
| 2005/0251567 A1 | 11/2005 | Ballew et al. |
| 2009/0043809 A1* | 2/2009 | Fakhouri ................ G06Q 10/04 |
| 2009/0063123 A1* | 3/2009 | Buckler ........... G06F 17/30598 703/22 |
| 2009/0241117 A1 | 9/2009 | Dasgupta et al. |
| 2010/0146085 A1 | 6/2010 | Van Wie et al. |
| 2010/0313199 A1 | 12/2010 | Chen et al. |
| 2012/0124591 A1 | 5/2012 | Cadambi et al. |
| 2012/0324472 A1 | 12/2012 | Rossbach et al. |
| 2013/0198718 A1 | 8/2013 | Kunze et al. |
| 2013/0227091 A1* | 8/2013 | Tompkins ........... G06F 9/45558 709/220 |
| 2014/0095604 A1 | 4/2014 | Bank et al. |
| 2014/0157262 A1 | 6/2014 | Hicks et al. |
| 2014/0280956 A1* | 9/2014 | Shu ..................... H04L 67/1004 709/226 |
| 2014/0282394 A1 | 9/2014 | Karimisetty et al. |
| 2015/0213723 A1 | 7/2015 | Vattikonda et al. |
| 2015/0244585 A1 | 8/2015 | Birk et al. |

OTHER PUBLICATIONS

U.S. Appl. No. 14/657,910, Provisioner For Cluster Management System, filed Mar. 13, 2015.

* cited by examiner

US 10,310,911 B2

SOLVER FOR CLUSTER MANAGEMENT SYSTEM

RELATED APPLICATIONS

This patent application claims the benefit under 35 U.S.C. § 119(e) of U.S. Provisional Application No. 61/953,106, filed Mar. 14, 2014.

TECHNICAL FIELD

Embodiments of the present invention relate to provisioning and managing a cluster, and more specifically to provisioning and managing a cluster as a single entity.

BACKGROUND

Web applications may be implemented as a multi-tiered application stack configured in a cluster. For example, a common multi-tiered application may include a database layer, an application server layer and a web application layer. Components within each of these layers may have their own constraints and dependencies. Provisioning and managing the cluster for such a multi-tiered application stack can be difficult and time consuming for an administrator.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
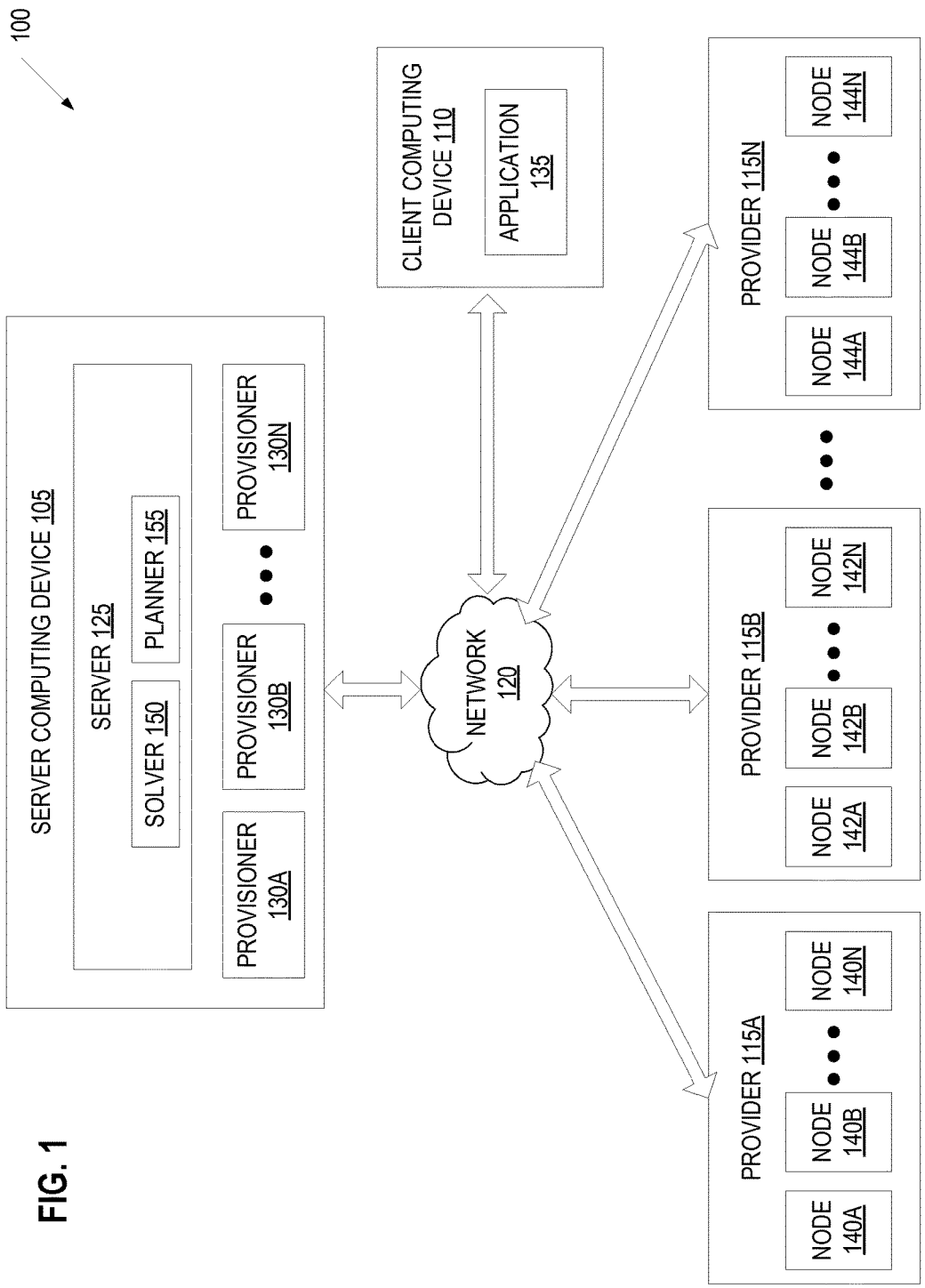
FIG. 1 illustrates an example system architecture for a cluster management system, in accordance with embodiments described herein.

Embodiments are directed to a cluster management system that provisions multi-tiered applications as clusters. The cluster management system receives a cluster management operation and determines how to perform the cluster management operation using a sequence of node level tasks. The cluster management system exposes simple interfaces to administrators and allows easy customization of the properties of provisioned clusters, including software services, hardware configurations and infrastructure providers. An administrator may submit a cluster management operation request with a specified cluster template, desired number of nodes and custom configurations. The cluster management system may then determine a valid cluster layout that satisfies all constraints determined from the cluster template and configuration, determine a sequence of node level tasks to achieve the determined cluster layout, and then interface with third party infrastructure providers to implement the node level tasks. Accordingly, most of the decisions and tasks for provisioning a cluster and/or modifying an existing cluster are automated in embodiments, significantly decreasing the complexity, difficulty and time associated with setting up or modifying a cluster for a multi-tiered application stack.

The cluster management system described in embodiments allows users to manage clusters as single entities. As a result, users do not have to know information about nodes that are included in a cluster. A node is a machine, real or virtual, that consists of a service or collection of services running on hardware or a virtual machine. The service is an application, process, or other piece of software. A cluster is a collection of nodes. Typically, nodes in a cluster can communicate with one another to provide some functionality that each individual node is unable to fully provide. An example of a cluster is a collection of nodes that work together to provide a distributed file system like Hadoop® HDFS.

The cluster management system described in embodiments includes a server and a collection of provisioners. The server is responsible for determining what should be done to achieve different cluster management operations. A cluster management operation is an action that is performed on a cluster, affecting some or all of the nodes in the cluster. Some example cluster management operations are creating, deleting, shrinking, expanding, upgrading, rollback, configuring, starting, and stopping a cluster or its services. Cluster level operations typically involve many node level tasks. For example, configuring a cluster usually requires configuring services on each node in the cluster, and may also involve stopping and starting those services in a particular order.

Cluster management operations usually obey some constraints as well. For example, when expanding a cluster, an administrator usually does not want the system to make any changes to existing nodes, and usually wants the new nodes to mirror the types of nodes already existing in the cluster.

The cluster management system first takes the cluster management operation and cluster, and solves the problem of how to perform the cluster management operation while obeying all constraints that apply to the cluster. The result is that cluster level operations are broken down into node level tasks that are coordinated and performed in a way that all constraints are satisfied. A node level task (also referred to herein simply as a task) is an action that is performed on a node. Some examples of node level tasks are creation and deletion of a node, and the installation, initialization, configuration, start, stop, or removal of a service on the node.

The cluster management system may also store the state of all provisioned clusters as well as a history of all operations performed. In embodiment, the server does not perform any of the node level tasks. Instead, the server may place tasks onto a task queue for provisioners to execute. In one embodiment, provisioners are responsible for actually executing the node level tasks on the desired node, and then reporting back to the server success or failure of a given node level task.

Referring now to the figures, FIG. 1 illustrates an example system architecture 100 for a cluster management system, in accordance with embodiments described herein. In one embodiment, the system architecture 100 includes a server 125 and a collection of provisioners 130A-130N connected to one or more providers 115A-115N and a client computing device 110 via a network 120. The network 120 may be a public network (e.g., the Internet), a private network (e.g., a local area network (LAN), wide area network (WAN), intranet, etc.), or a combination thereof.

The server computing device 105 may be a physical machine and/or a virtual machine hosted by a physical machine. The physical machine may be a rackmount server computer, a desktop computer, a blade server computer, a portable computer, or other computing device.

Each provider 115A-115N (also referred to herein as an infrastructure provider, platform provider or cloud provider) provides infrastructure for creating and running nodes 140A-140N, 142A-142N, 144A-144N. Each provider 115A-115N may be a third party service or system with its own set of application programming interfaces (APIs) for interacting with that provider. Some providers 115A-115N may be public cloud providers such as Rackspace®, Google Cloud Platform, Google App Engine, Joyent®, Amazon® Web Services (AWS) (including Amazon Elastic Compute Cloud (EC2®), Amazon Simple Storage Service (S3), and so on). Other providers 115A-115N may be private providers, such as instances of Openstack®. Each provider 115A-115N may provide physical machines and/or host virtual machines that may be configured as nodes for a cluster. Providers 115A-115N may provide infrastructure as a service (IaaS). Providers 115A-115N may also provide a platform used by an infrastructure as a service (IaaS).

Client computing device 110 may be any type of computing device, such as a laptop computer, desktop computer, mobile phone, tablet computer, and so on. Client computing device 110 may host or run an application 135 that interfaces with server 125. The application 135 may be a generic web browser or may be an application specifically configured for communicating with server 125 (e.g., for interfacing with one or more APIs of server 125). Via the application 135, a user may generate and/or select a cluster template, select a desired configuration for a cluster, select a desired cluster management operation, and so on.

Responsive to receipt of a cluster management operation, server 125 may invoke solver 150 and/or planner 155 to determine how to implement the cluster management operation. If the cluster management operation will create a new cluster or cause a cluster layout for an existing cluster to change, solver 150 determines a target cluster layout that will satisfy the cluster management operation. Planner 155 then determines what node level tasks should be performed to transition the cluster from a starting state (e.g., an initial cluster layout) to the target cluster layout. Planner 155 then assigns the node level tasks to the provisioners 130A-130N until all node level tasks have been performed and the cluster management operation has been completed. For each cluster management task, a provisioner 130A-130N determines an appropriate provider 115A-115N to satisfy the node level task, and uses an API for that provider 115A-115N to instruct the provider to perform the node level task. For example, provisioner 130A may receive a create node task, and may instruct provider 115A to create node 140A to satisfy the node level task. The created node 140A may have one or more properties indicated in the node level task and specified to the provider 115A by the provisioner 130A. These properties may include specified hardware properties and/or specified software properties. Upon completion of all of the node level tasks, server 125 may send a success message to application 135. The success message may include information about the state of the cluster after the cluster management operation, such as a deployed cluster layout, information about provisioned nodes (e.g., addresses of nodes, names of nodes, hardware types of the nodes, services running on the nodes, etc.), and so on.

Figure 2:
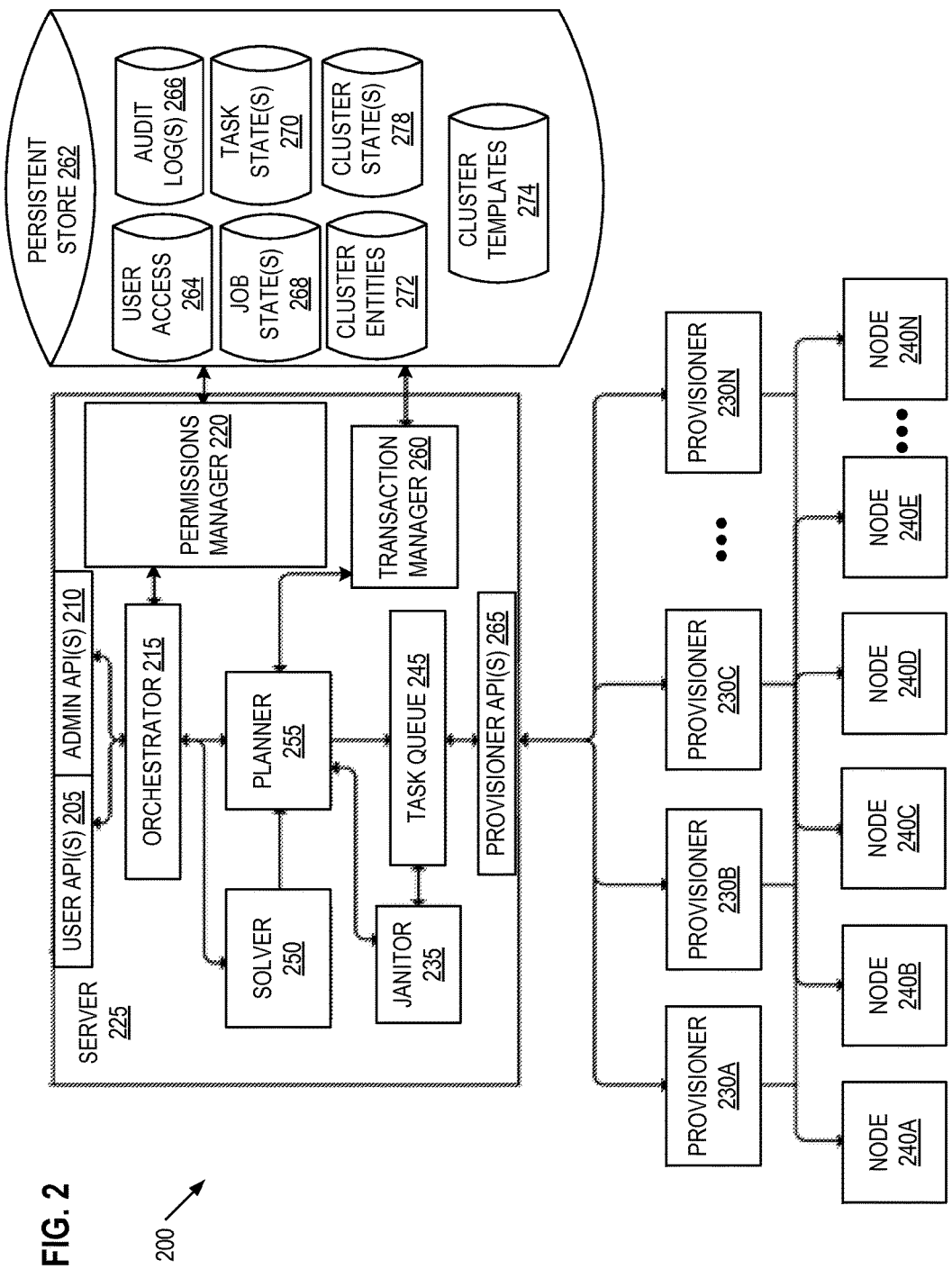
FIG. 2 illustrates components of a cluster management system, in accordance with one embodiment.

FIG. 2 illustrates components of a cluster management system 200, in accordance with one embodiment. The cluster management system 200 includes a server 225, a persistent data store 262, multiple provisioners 230A-230N, and multiple nodes 140A-240N that together form a cluster for a multi-tiered application. The server 225 and provisioners 230A-230N may correspond to server 125 and provisioners 130A-130N of FIG. 1 in embodiments.

Server 225 may perform several separate, but related roles. The first role is to interact with administrators to define providers, hardware, images, services, and templates that can be used for cluster management purposes. These definitions may be persistently stored in persistent data store 262. The second role of the server 225 is to create plans to perform cluster management operations. In short, the second role is to transform cluster level operations into a plan of node level tasks, all of which can be wrapped in a transaction. The final role is to interact with provisioners 230A-230N to coordinate the execution of those node level tasks.

Server 225 includes one or more APIs, which may include user APIs 205 and administrator APIs 210. Administrator APIs 210 may be used to create and modify cluster templates, set cluster configurations, create new users, and so on. The administrator is responsible for defining cluster entities such as providers, hardware types, image types, services and cluster templates. These cluster entities 372 are used to perform cluster management operations, and may be defined through the administrator APIs 210.

Server 225 can create and delete machines, real or virtual, through different providers. As previously mentioned, a provider can be an instance of an infrastructure as a service (IaaS) provider, such as Rackspace, Joyent, Google, or AWS. A provider can also be a platform used by an IaaS, such as Rackspace. A provider can also be a custom provider created by the user that manages bare metal, or any other system that can provide a machine to run services on. Server 225 is not concerned with how to create and delete machines. Instead, the provisioners may be relied upon to handle such minutia. An administrator creates a provider entity by specifying a unique name, a description, and a list of key-value pairs that a provisioner plugin uses when communicating with a particular provider. The key-value pairs may vary for different provisioner plugins. For example, one key-value pair may specify the universal resource locator (URL) to use to communicate with a particular provider. Another key-value pair may specify the user identifier (ID) to use with the provider, and another may specify a password to use.

A hardware type is an entity that unifies hardware from different providers into a single entity that can be referenced elsewhere. Administrators specify a unique name, a description, and a mapping of provider name to provider specific key-value pairs. Hardware types may include multiple different mappings or definitions associated with different providers. For example, an administrator can define a "small" hardware type. In it, the admin maps, for example, the "amazon" provider to have a key-value pair with "flavor" as a key and "m1.small" as a value. The "amazon" provider understands what a flavor is, and understands what the "m1.small" flavor refers to. Similarly, the admin may map the "rackspace" provider to have a key-value pair with "flavor" as key and "2" as value. The "rackspace" provider understands what a "flavor" is and what the "2" flavor refers to. Now, elsewhere in the server 225, the administrator can simply refer to the "small" hardware type instead of referring to different flavor identities that depend on what provider is in use. Accordingly, a first hardware definition may be used for a node if a first provider is used to create the node having the hardware type and a second hardware definition may be used for the node if a second provider is used to create the node having the hardware type.

An image type is an entity that it unifies images from different providers into a single entity that can be referenced elsewhere. An image is the state of a computer or virtual machine, and usually contains an operating system and some basic software. Administrators specify a unique name, a description, and a mapping of provider name to provider specific key-value pairs. For example, an administrator can create a "centos6" image type that maps the "Amazon" provider to some identifier for an image that uses centos6 as its operating system, and that maps the "rackspace" provider to some other identifier for an image that uses centos6 as its operating system. Now, elsewhere in server 225, the administrator can simply refer to the "centos6" image type instead of referring to different image identities that depend on what provider is in use.

A service is a piece of software that can run on a node. An administrator defines a service by giving it a unique name, a description, a set of other services it depends on, and a set of provisioner actions that can be run with the service. Provisioner operations contain an action that can be performed on a service on a node, such as install, remove, initialize, configure, start, and stop. Provisioner operations may also contain a script and any optional data that an automator plugin will use to actually perform a node level task.

A cluster template is a blueprint that describes how a cluster should be laid out by specifying how different services, image types, and hardware types can be placed on nodes in a cluster. Cluster templates contain enough information that a user can specify just a template and a number of machines to create a cluster. Each cluster template may have a unique name, a short description, and a section devoted to compatibilities, defaults, and constraints. When a user chooses to create a cluster with some number of machines based off a cluster template, the solver 250 solves for a layout of nodes and services that satisfies the compatibilities and constraints given in the template. The solved layout is then sent to the planner 255, which coordinates the execution of all tasks that are to be completed in order to create the cluster. These operations are described more fully below.

A cluster template may include a compatibility section. In one embodiment, the compatibility section defines three things. The first information defined in the compatibility section is a set of services that are compatible with the template. This means that when a user goes to create a cluster with this cluster template, the user is allowed to specify any service from the defined set as services to place on the cluster. Server 225 may not automatically pull in service dependencies in some instances, so the full set of compatible services are defined in some embodiments. Next, a set of compatible hardware types may be defined. This means only hardware types in the compatible set can be used to create a cluster. Similarly, the compatible image types may be defined, where only image types in a compatible set can be used to create a cluster.

A cluster template may include a defaults section that describes what will be used to create a cluster if the user does not specifically specify anything beyond the number of machines to use in a cluster. In some embodiments, everything in this section can be overwritten by the user, though it is likely only advanced users will want to do so. Cluster templates may contain a set of default services, a default provider, and a default configuration. Optionally, a hardware type to use across the entire cluster, and an image type to use across the entire cluster, may be specified. The default services should be a subset of the services defined in the compatibility section. Similarly, if a hardware type or image type is specified, it should be one of the types given in the compatibility section. Lastly, the configuration usually describes different configuration settings for the services that will be placed on the cluster. In some embodiments, the configuration may be separate from the cluster template.

User APIs 205 may be used to perform initiate management operations using preconfigured cluster templates and/or cluster configurations. Users make cluster management operation requests through the user APIs 205. This may ensure that once an administrator sets up the constraints for an organizations' clusters, users may later perform cluster management operations to create or modify clusters, and those cluster management operations will not cause those clusters to deviate from the initially established constraints. Thus, the administrator may set up criteria for different layers in a multi-tiered application stack, and users may later repeatedly provision clusters in accordance with the criteria. Once the cluster template and configuration have been set up, users may use them to create as many clusters as desired. For example, a user may use the user API 205 with minimal inputs to generate a new cluster that closely or exactly matches other clusters that may have been generated for an organization. The administrator may be guaranteed that the user is not misconfiguring the cluster.

In one embodiment, server 225 includes an orchestrator 215, a permissions manager 220, a solver 250, a planner 255, a janitor 235, a task queue 245, and a transaction manager 260. Alternatively, the functionality of one or more of the orchestrator 215, permissions manager 220, solver 250, planner 255, janitor 235, task queue 245, and/or transaction manager 260 may be divided into additional modules or may be combined into a single module. Server 225 may additionally include one or more provisioner APIs 265 for interfacing with provisioners 230A-230N.

Permissions manager 220 may perform authentication and authorization operations to authenticate users and/or determine their permissions. Permissions manager 220 may maintain user accounts 264 in persistent store 262, each of which may be associated with a particular group or tenant. Users may provide credentials to permissions manager 220 to login to a particular user account.

The Permissions Manager 220 is in charge of deciding which users have permission to perform which action on which entity. An entity here is any of the previously mentioned administrator defined cluster entities 272 (e.g., hardware types, image types, services, etc.), as well as actual cluster instances. Once permissions manager 220 authenticates the user, the user is permitted to access data (e.g., entities) associated with that user's access level and a particular group or tenant associated with that user account. Each user account may have access to one or more entities (e.g., cluster templates, cluster configurations, etc.) cluster management operations, and so on associated with a particular group or tenant. The existence of other tenants may not be made known to the user. Moreover, entities such as cluster templates, image types, hardware types, clusters, cluster configurations, cluster layouts, etc. associated with other tenants may not be visible to the user.

The permissions manager 220 additionally ensures that users can only perform actions they are authorized to perform. For example, an admin from a first tenant (group A) may only read and write entities belonging to the first tenant and not entities belonging to a second tenant (group B). For each user and entity pair, the permissions manager 220 determines what actions the user can perform on the entity. Some examples of actions are reading, writing, executing, and granting. A read permission gives the user the ability to read a specified entity. A write permission gives the user the ability to change the entity. An execute permission applies to certain types of entities, and gives the user the ability to perform one or more operations on those entities. For example, an execute permission on a cluster template means the user is able to create a cluster with the template. A grant permission means the user is able to grant other users permission to perform certain actions on the entity. Actions are not limited to those listed above and can include many more.

By default, server 225 may support a super admin that has all permissions on all entities. The super admin is able to create admins that have permission to write admin entities and perform cluster operations, as well as grant permissions to other users in their group. A group (also referred to as a tenant) is a set of users that share access to a particular set of entities.

The default permissions policy is not the only possible policy. For example, it is possible to create a policy where the super admin only has permission to create regular admins and grant them permission, but no permission to write any admin entities or perform any cluster operation. This may be desired if the role of the super admin is simply to delegate responsibility to admins for each user group.

Another policy may limit all admin permissions to be just that of writing admin entities, but leave cluster operations completely for users. Admins therefore would not be able to read cluster information or perform cluster operations. A setup like this may be desired if privacy is important, and each user needs to make sure only they are able to access their cluster and the data on their cluster. Users may have various access levels to a cluster and/or the data on a cluster. A user may have access to specific data in a cluster and/or to specific actions. For example, a user may have access to perform one or more of view, create, delete and/or modify a cluster. The type of permissions policy implemented by the permissions manager 220 should not be limited to the scope mentioned in the previous examples.

In one embodiment, permissions manager 220 hooks into existing user management systems such as lightweight directory access protocol (LDAP). The permissions manager 220 in one embodiment has a pluggable interface for integration with existing user management systems such as LDAP. This enables the permissions manager 220 to leverage existing systems to obtain a list of users as well as the group or groups the one or more users belong to.

Cluster management operation requests received by the user API 205 are provided to orchestrator 215. The orchestrator 215 is able to determine, from a high level, what is performed when implementing different cluster management operations. Some operations, like cluster creation, should first be sent to the solver 250 to find a suitable cluster layout for the planner 255 to work with. Other operations, like cluster deletion, can be sent directly to the planner 255.

Some examples of types of cluster management operations that may be requested include creating, deleting, shrinking, expanding, configuring, starting, stopping, and upgrading clusters. Some of these operations change a cluster layout while others are performed on an existing cluster without any layout change. Orchestrator 215 determines which operations require constraints to be solved and/or which operations will change a cluster layout for a cluster. In one embodiment, orchestrator 215 determines whether a received cluster management operation will change a cluster layout or require constraints to be solved based on a current cluster state and a nature of the cluster management operation.

In general, operations that add services or nodes to a cluster will change constraints or a cluster layout. Operations that remove services from nodes generally will not change constraints or a cluster layout. Some operations may be more complicated and depend on the cluster state. One example of such a cluster management operation is one that modifies dependencies of a service. For example, a cluster update operation may change dependencies (e.g., may change service dependencies via a service update), and these changed dependencies may modify constraints and ultimately cause a cluster layout to change. However, a cluster update operation that does not change dependencies may not cause constraints or a cluster layout to change.

Operations that may change a cluster layout (such as those that require constraints to be solved) are sent to the solver 250. A cluster layout defines the exact set of nodes for a cluster, where each node definition contains which hardware and image types to use, as well as the set of services that should be placed on the node. Those operations for which no constraints need to be solved and/or that will not change a cluster layout can be directly sent to planner 255.

In one embodiment, the orchestrator 215 also handles the case where the solver 250 determines that an operation is impossible to complete without breaking one or more constraints. In such a case a meaningful error message should be generated and provided to the user, and various internal logs 266 and states 268, 270, 278 may be updated accordingly.

Solver 250 is responsible for taking an existing cluster layout (or an empty cluster if provisioning a new cluster), the cluster template associated with the cluster, and in some instances user specified properties or configurations, and finding a valid cluster layout that satisfies all inputs and constraints from the cluster template, configurations and/or existing cluster layout.

As mentioned, a cluster template is included with the cluster management operation request. Cluster templates make it so that administrators don't have to specify every single detail for every cluster. To set up a cluster using traditional techniques, an administrator finds out that a certain type of cluster needs to be created. The admin then manually gets some hardware, installs some operating system on it, then installs the necessary software on each node. The admin then goes and manually configures the services on each node, then manually starts and initializes the services in the correct order, depending on which services depend on which others. Everything is a manual process, and small tweaks to the cluster require manual changes and specialized knowledge. For example, creating a cluster with five nodes may require a different layout than a cluster with fifty nodes. The administrator must then be involved in creating the five node cluster and then the fifty node cluster. With cluster templates 274, small tweaks are automatically taken care of, and manual steps are removed.

Cluster templates 274 also give administrators power and flexibility. An administrator can make a cluster template 274 completely rigid, where every service, hardware type, image type, and configuration setting is specified and unchangeable by end users. An administrator can also make a flexible cluster template that allows end users to specify properties they are interested in, such as which services should be placed on the cluster and what hardware and image to use.

The cluster template and/or user provided configuration may include one or more constraints, or may include data that is usable to derive one or more constraints. In one embodiment, server 225 supports two classes of constraints—layout constraints and service constraints. However, the general idea of a constraint based cluster template is not restricted to just these types of constraints. Many additional types of constraints can be thought of and potentially added.

Layout constraints define which services must coexist with other services on the same node and which services cannot coexist on the same node. For example, in a Hadoop® cluster you generally want data nodes (datanode), region servers (regionserver) and node managers (nodemanager) to all be placed together. To achieve this, an administrator would put all three services in the same "must coexist" constraint.

In one embodiment, must coexist constraints are not transitive. For example, if there is one constraint saying service A must coexist with service B, and another constraint saying service B must coexist with service C, this does not mean that service A must coexist with service C. This is to prevent unintended links between services, especially as the number of must coexist constraints increase.

In one embodiment, if a must coexist rule contains a service that is not on the cluster, it is shrunk to ignore the service that is not on the cluster. For example, a cluster template may be compatible with data nodes, node managers, and region servers. However, in one example, by default only data nodes and node managers are placed on the cluster. In such an embodiment, a constraint stating that data nodes, node managers and region servers must coexist on the same node would get transformed into a constraint that just says data nodes and node managers must coexist on the same node.

The other type of layout constraint are "can't coexist" constraints. For example, in a Hadoop cluster, you generally do not want your name node (namenode) to be on the same node as a data node (datanode). Specifying more than two services in a cannot coexist rule means the entire set cannot exist on the same node. For example, if there is a constraint that service A, service B, and service C cannot coexist, service A and service B can still coexist on the same node. Though supported, this can be confusing, so the best practice is to keep the cannot coexist constraints binary. Anything not mentioned in the must or can't coexist constraints are generally allowed.

Service constraints define hardware types, image types, and quantities for a specific service that can be placed on the cluster. A service constraint can contain a set of hardware types that a service must be placed with. Any node with that service should (or must) use one of the hardware types in the set. If the hardware type field is empty for a service, the service can go on a node with any type of hardware. Similarly, a service constraint can be a set of image types that a service should (or must) be placed with. Any node with that service should use one of the image types in the set. If the service type field is empty for a service, the service can go on a node with any type of image (e.g., an image having any type of operating system).

A service constraint can also limit the quantities of a particular service across the entire cluster. The service constraint can specify a minimum and maximum number of nodes that are to contain the service across the entire cluster. A ratio can also be specified, stating that a service should be placed on at least a lower threshold percentage of nodes across the entire cluster, or at most an upper threshold percentage of nodes across the entire cluster. Other types of constraints are possible. For example, a constraint could be added stating that there should always be an odd number of nodes with the specified service, or that the service is only allowed if there are at least a specified number of nodes that have another service.

Figure 4:
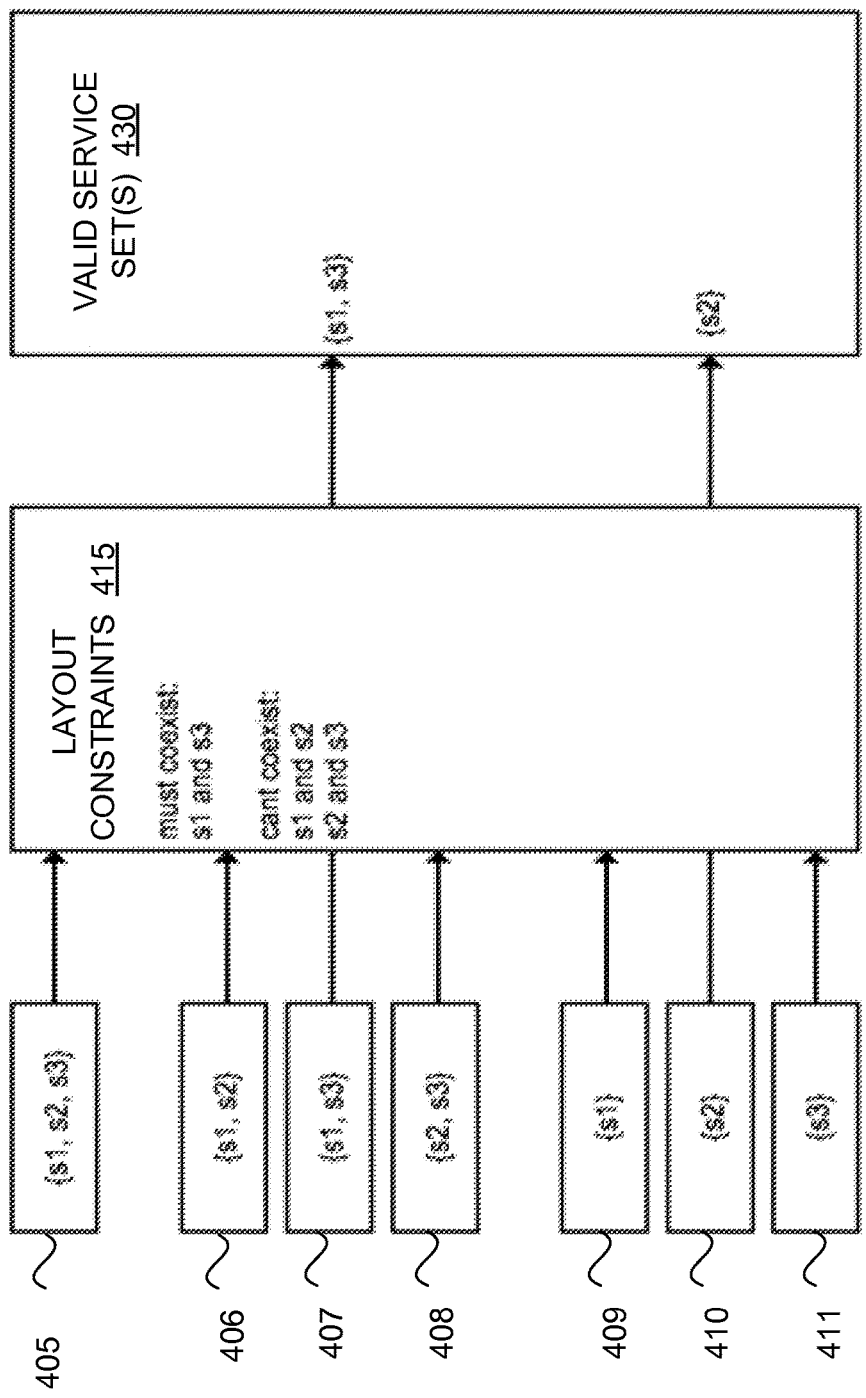
FIG. 4 is a block diagram of one example of finding valid service sets to satisfy a cluster management operation.
Figure 5:
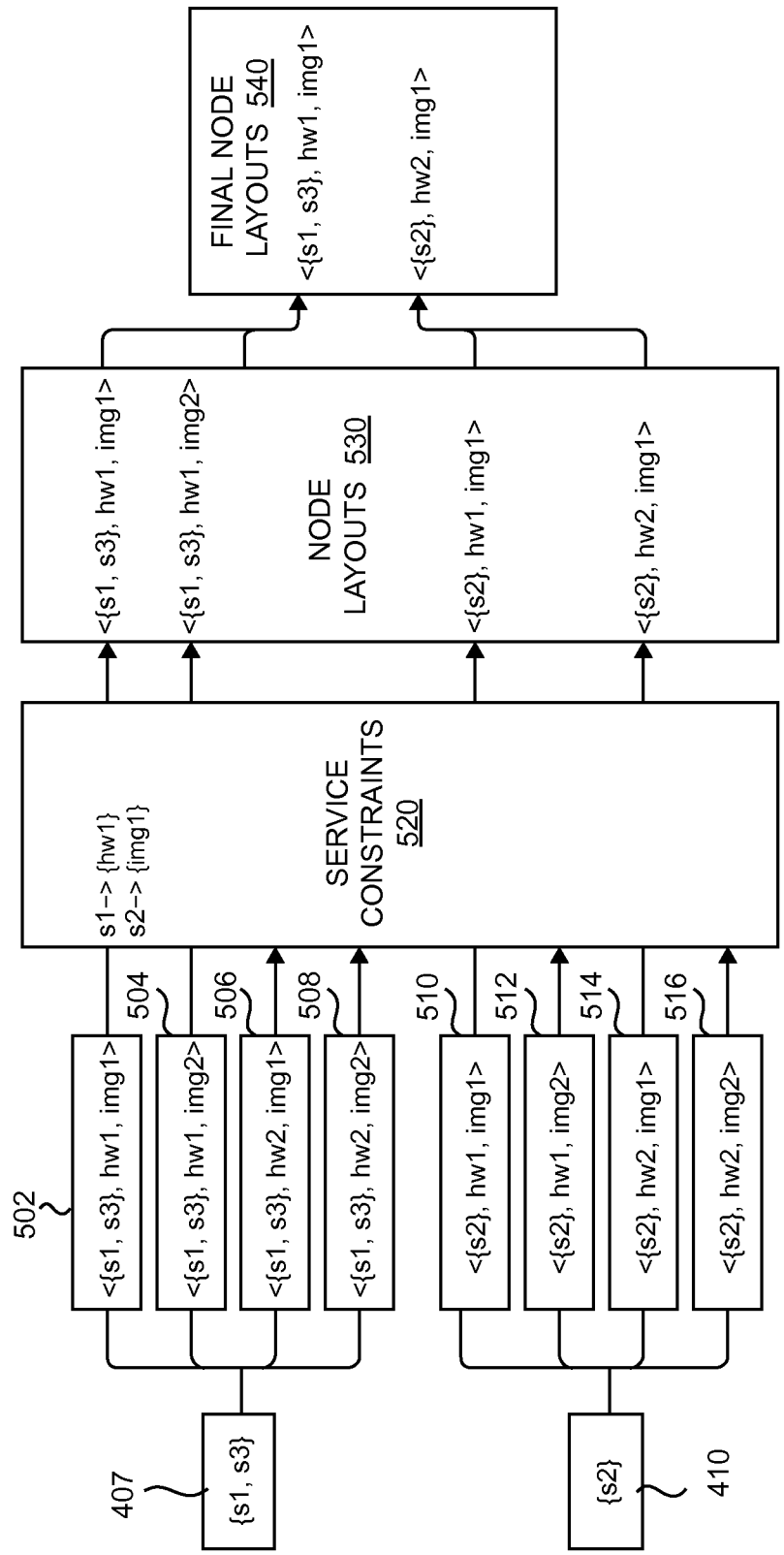
FIG. 5 is a block diagram of one example of finding valid node layouts to satisfy a cluster management operation.
Figure 6:
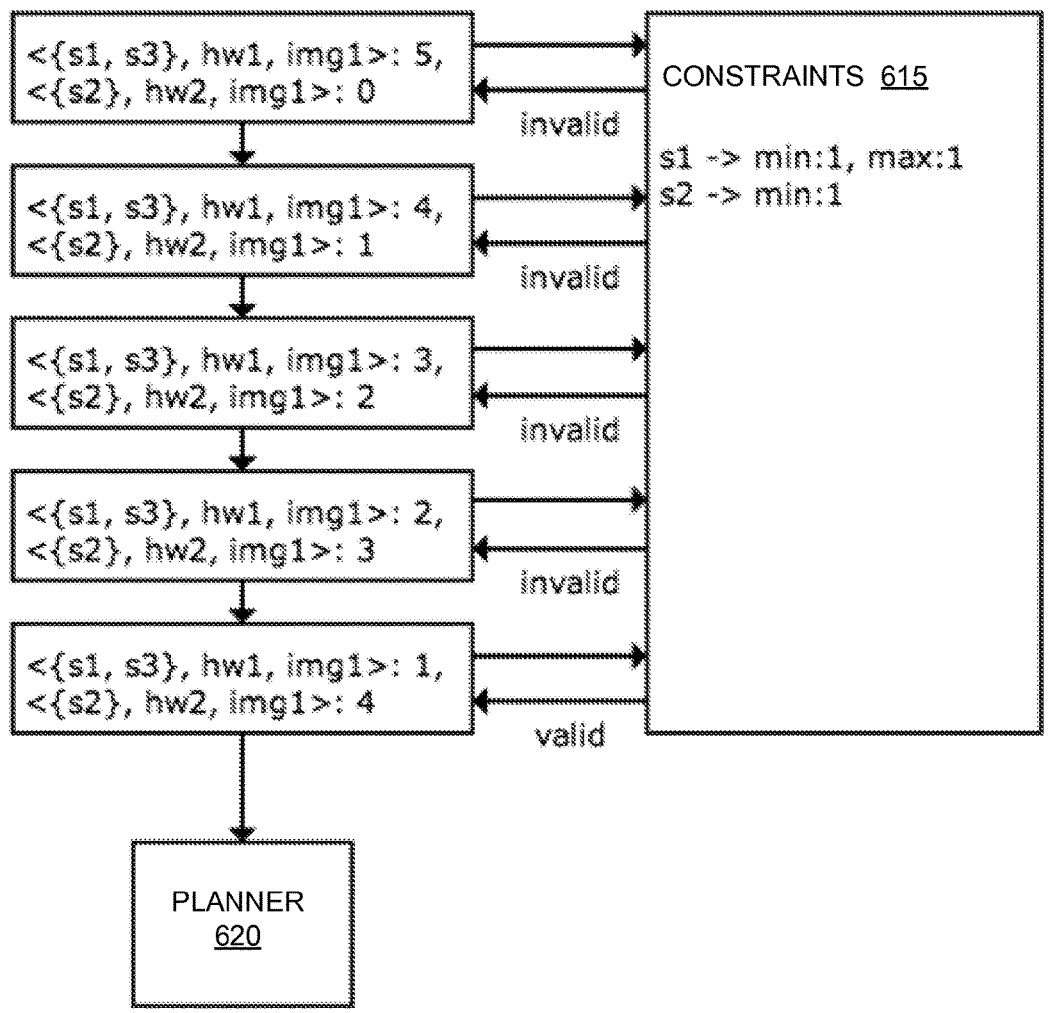
FIG. 6 is a block diagram of one example of finding a valid cluster layout to satisfy a cluster management operation

Solver 250 determines all of the layout constraints and service constraints associated with a particular cluster management operation, and then solves for a cluster layout that satisfies all of these constraints. In one embodiment, there are three stages involved in solving for a cluster layout. The first stage of solving for a cluster layout is finding valid service sets, an example of which is illustrated in FIG. 4. The second stage of solving for a cluster layout is finding valid node layouts, an example of which is illustrated in FIG. 5. The third stage in solving for a cluster layout is finding a valid cluster layout, an example of which is illustrated in FIG. 6. It should be noted that what is described is just one way to find a cluster layout. There are many ways this constraint satisfaction problem could be solved.

The cluster layout solution is deterministic in embodiments. This ensures that given the same set of inputs, the same cluster layout result will be achieved. Thus, even if there are multiple valid cluster layouts that may satisfy all constraints, the same valid cluster layout will be chosen each time given the same set of inputs. Once a cluster layout is created, solver 250 may provide this target cluster layout to planner 255. Solver 250 may also provide a starting cluster layout to the planner 255 in some embodiments. Alternatively, the starting cluster layout and/or target cluster layout may be stored in persistent store 262 or in memory, and planner 255 may access the persistent store 262 or memory to obtain the starting cluster layout and the target cluster layout.

Planner 255 takes a starting cluster layout, a target cluster layout and a cluster management operation, and creates an execution plan of node level tasks that can be performed in order to perform the cluster management operation. Accordingly, planner 255 divides a cluster level operation into a collection of node level tasks.

Planner 255 coordinates which tasks must occur before other tasks, and which tasks can be run in parallel. Ordering of tasks is based on action dependencies that are inherent to the type of cluster operation being performed, and also based on the service dependencies defined by the administrator. For example, when creating a cluster, creation of nodes must always happen before installing services on those nodes. That is an example of a dependency that is inherent to the create cluster operation. An example of a dependency derived from services is if service A depends on service B, then starting service A must happen after service B is started. In one embodiment, the planner 255 examines the cluster layout and action dependencies, and creates an execution plan that is a directed acyclic graphed (DAG) based on the cluster action and cluster layout.

In one embodiment, planner 255 arranges node level tasks in a series of stages. Each node level task in a particular stage can be executed in parallel. Thus, planner 255 may group tasks that can be run in parallel into stages. Planner 255 may set a current stage, determine the node level tasks in the current stage, and place those tasks (that can currently be run) onto task queue 245 for consumption by the provisioners 230A-230N. In one embodiment, planner 255 does not know how to perform node level tasks. Planner 255 may instead include information identifying results of node level tasks, and may rely on provisioners 230A-230N to handle implementation. Once all tasks in a stage are complete, the planner 255 may place all tasks in the next stage onto the task queue 245.

Planner 255 may place tasks (e.g., all tasks in a stage) onto the task queue 245. Provisioners 230A-230N periodically poll the server 225, asking for tasks to execute. If the task queue 245 has tasks, the planner 255 will assign a task to the provisioner 230A-230N and wait for it to report back with a success or failure. Based on the success or failure, the planner 255 can decide to wait for more tasks to finish, move on to the next stage, or initiate rollback plans in case the cluster operation cannot be successfully completed. Note that in alternative embodiments a data structure other than a queue may be used for keeping track of node level tasks to be performed. Since in some embodiments the order of the node level tasks in the queue is unimportant, the task queue may instead be implemented as an unordered set of tasks, for example.

Coordination of node level tasks may be performed though provisioner APIs 265, task queue 245, and janitor 235. The janitor 235 will periodically time out tasks if they have been taken from the queue, but the server 225 has not heard back about the task for more than a configurable threshold of time. In case a task fails, it may be retried a configurable amount of times. Almost all tasks are idempotent with the exception of the create node task. If a create note tasks fails, it is possible that the actual machine was provisioned, but there was an issue with the machine. In this case, the machine may be deleted before another is created to prevent resource leaks. In case a provisioner fails to reply back with a task failure or success after some configurable timeout, the planner 255 will assume a failure and retry the task up to the configurable retry limit. Janitor 235 may run in the background to perform the timeout.

Cluster operations are transactional in embodiments. Accordingly, server 225 will try to ensure that either the entire operation completes successfully or it does not complete, at all. What this means is that there is a way to roll back changes if an operation is unsuccessful. This is accomplished by the planner 255 working in conjunction with transaction manager 260.

In one embodiment, the planner 255 works with the transaction manager 260 throughout the execution of a cluster management operation to provide a complete audit log 266 of all tasks performed, and to store a cluster state 278 for rollback purposes. The audit log may include a record of every single operation. For each stage and each node level task, the planner 255 may write an entry to the audit log 266. For example, planner 255 may write to the audit log 266 when a task is placed onto the queue for consumption by a provisioner, again when the task is taken from the queue, and once more when a provisioner comes back with the task status. Retries may be logged in the same way as separate tasks so a full and complete history is kept. The planner 255 also works with the transaction manager 260 to ensure that each task is tied to the correct cluster transaction so that audits can be performed for periods of time or by cluster action.

Planner 255 may also work with the transaction manager 260 to store job states 268 and/or task states 270. Job states 268 define the state of a cluster management operation. In one embodiment, there is one job state for each cluster management operation, with each job state containing the status of the job and the DAG of tasks for carrying out the cluster management operation. There can be many statuses for a job. In one embodiment, job status is one of running, paused, completed, or failed. Other embodiments may include additional job statuses, such as waiting for approval or blocked. Task states 270 define the state of a node level task. In one embodiment, there is one task state for each node level task, with each task state containing the status of the task and details needed to complete the task. In one embodiment, task status is one of submitted, in progress, successful, or failed. Other embodiments may include additional task statuses, such as paused or cancelled. Task state also includes details needed to complete the task. In one embodiment the details include the type of node level task, such as create node or start service, and settings required to complete the task, such as provider credentials or service arguments.

The transaction manager 260 ensures that operations are atomic, performing rollbacks if needed. Transaction manager 260 also records all actions performed for auditing purposes. The transaction manager 260 is responsible for maintaining and managing cluster state. Transaction manager 260 may store a snapshot of the cluster after each successful cluster operation. The snapshot contains every detail about a cluster, and so includes the entire cluster state 278. For example, the snapshot may contain the full cluster layout, every single configuration setting, hostnames, internet protocol (IP) addresses, secure shell (SSH) keys, and many other details.

The transaction manager 260 is able to rollback to any previous cluster state in case of an operation failure. In one embodiment, rolling back to a previous state is a functional rollback where the cluster layout is exactly the same, but where some node information may change, depending on the operation. For example, when shrinking a cluster from ten nodes to five nodes, it is possible that four nodes are deleted but some issue happens on the fifth node and the operation must be rolled back. In that case, the transaction manager 260 is able to tell the planner 255 that it needs to recreate four nodes with specified hardware, specified images, and specified services on each node with specified configuration settings. However, in some embodiments transaction manager 260 does not guarantee that the same IP addresses are used and the same hostnames are used. So functionally the rolled back cluster is the same and the layout is the same, but some details may change. After a rollback, the cluster state 278 is saved again as a separate entry to preserve the full cluster history.

A cluster operation can fail if a given task is retried past a maximum number of retries configured for the server 225. If this happens, the planner 255 will notify the transaction manager 260 that the cluster operation has failed, and the transaction manager 260 will provide the planner 255 with the full state of the cluster prior to the start of the transaction (prior to the cluster management operation). The planner 255 is then able to create another execution plan to roll back the state of the cluster.

The planner 255 may create the execution plan to roll back the state of the cluster by creating a new DAG based on the current failed DAG. In one embodiment, the planner 255 starts in the current failed stage, and for each successfully completed task, it creates a corresponding rollback task. The planner 255 then works backwards in the original DAG, adding rollback tasks for each successfully completed task. For example, for a configure service A task on node X, the rollback task would be a configure service A task on node X, but with the previous configuration settings as given by the transaction manager 260. Similarly, for an install service B task on node Y, the rollback task would be to remove service B from node Y. As another example, a create node Z task has a rollback task of delete node Z.

The planner 255 is thus able to work backwards to create a rollback task plan from the original failed plan. Before actually starting the rollback, the transaction manager 260 may store a snapshot of the cluster state at the point of failure for historical purposes. The planner 255 then proceeds to coordinate the rollback tasks as before (e.g., by dividing the DAG into stages and placing the tasks onto the queue for consumption by provisioners). If the rollback task plan also fails, the transaction manager 260 may store a snapshot of the state of the cluster at that moment, and mark the cluster for examination by an administrator. Cluster operations can be tried again in the future once the errors have been investigated.

In one embodiment, solver 250 may attempt to create a new solution for the cluster management operation after a failure. A particular cluster management operation may be implemented using multiple different valid solutions (e.g., multiple different cluster layouts). However, one such valid solution is initially selected deterministically. Solver 250 may generate a new constraint that causes the failed cluster layout to become an invalid solution. Thus, a different cluster layout will be solved for on the second attempt to create a solution. Planner 255 may then generate a new execution plan for the new cluster layout.

The provisioners 230A-230N are worker daemons that interface with server 225 through provisioner APIs 265. Provisioners 230A-230N are responsible for taking node level tasks from the server 225, executing the tasks, and reporting back to the server whether or not the tasks were successfully performed. A provisioner 230A-230N may poll server 225 for a task, and then receive assignment of a node level task from planner 255. The provisioner 230A-230N then executes the received task (e.g., by invoking an appropriate task handler plugin for the task). Once the received task is executed, the provisioner 230A-230N reports back results of the operation, including an indication of success or failure and any appropriate metadata (e.g., IP address, host name, etc.).

At a high level, provisioners 230A-230N simply perform tasks given to them by planner 255. Alternatively, provisioners 230A-230N provide an API to manage data and worker processes. Provisioners 230A-230N may each manage one or more worker processes (also referred to herein as workers or worker daemons). Workers are lightweight daemons that perform tasks and poll the server. In an embodiment that uses workers, the worker processes perform operations such as server polling and tasks given to the provisioners 230A-230N by planner 255. In the below description, embodiments are described in regards to a provisioner polling the planner 255, receiving tasks, and performing operations to complete those tasks. However, it should be understood that all such actions and operations that are described as being performed by the provisioners 230A-230N may instead be performed by workers that are managed by the provisioners.

These are the tasks that are performed to orchestrate cluster operations. Such tasks may include, for example, provisioning nodes (e.g., creating nodes) from cloud providers, installing/configuring software (e.g., bootstrapping nodes), configuring services on nodes, starting services on nodes, initializing services on nodes, stopping services, running custom commands, and so on. Each instance of the provisioner 230A-230N may poll server 255 for the next task in the queue. Once a provisioner 230A-230N receives a node level task, that provisioner handles the node level task to completion. In one embodiment, a plugin framework is utilized to handle any task for extensibility. In one embodiment, the provisioners 230A-230N are lightweight and stateless. Therefore, many provisioners 230A-230N can be run in parallel.

In one embodiment, each provisioner 230A-230N manages one or more worker processes. Each worker process may be capable of performing a node level task (e.g., invoking an appropriate plugin to perform a node level task). The workers may poll the planner 255 to request node level tasks. When a worker completes a node level task, the worker may report the completion to the planner 255.

Each running provisioner 230A-230N instance may continually poll the server 225 for tasks. In one embodiment, when a task is received, it consists of a Javascript object notation (JSON) task definition. This task definition may contain all the information needed by the provisioner 230A-230N to carry out the task.

Consider a typical scenario for provisioning a node on a cloud provider asynchronously. A node having given attributes is requested. These attributes may include a node size, an operating system to be installed on the node, a region, etc. The provisioner uses a provider API to cause a provider to perform a requested action on the node. The provider accepts the request and returns an internal ID for a new node it is going to create. During creation, the requesting provisioner may continually poll the provider for the new node's status and public IP address using the internal ID. The requesting provisioner then may perform some additional validation using the IP address, and declares success. The internal provider ID may be used later if the node is ever to be deleted. Similarly, the IP address provided for the node may be used in subsequent tasks.

In one embodiment, provisioners 230A-230N perform tasks by determining a correct provisioner plugin appropriate for the task and then using that correct provisioner plugin to complete the task. There are two types of provisioner plugins in one embodiment: provider plugins and automator plugins. Provider plugins are used to allocate, delete, and manage machines (e.g., virtual machines) using different infrastructure providers such as OpenStack, Rackspace, Amazon Web Services, Google Compute Engine, and Joyent.

Automator plugins are responsible for implementing the various services defined on a cluster. For example, a Chef® automator plugin could be used to invoke Chef recipes that install, configure, initialize, start or stop a service. Various plugins may be implemented to support desired technologies, such as a Puppet® plugin, a Docker® plugin, or even shell commands.

In one embodiment, provisioners 230A-230N are not directly installed on the target host or node, but rather use SSH (e.g., SSHD) to interact with the remote host, making the described architecture simple and secure. Moreover, no software associated with cluster management or the provisioners (e.g., no server components, provisioners, daemons, etc.) may be installed on the hosts for nodes. This may enable provisioners to interface with any provider without having to install special software on those providers for node creation, service installation and/or cluster management.

Since multiple provisioners can work concurrently, this layer of provisioners support execution of thousands of concurrent tasks. Provisioners 230A-230N can also be managed by the server 225 to automatically scale according to workload.

Planner 255 may track queue length, completion time for tasks, and/or other metrics. Planner 255 may automatically increase or decrease the number of provisioners and/or workers that are available for a user or tenant based on one or more criteria in view of these metrics. For example, if a queue length is consistently high, it can be an indication that there are not enough workers to handle the workload. As another example, if the task queue is constantly growing in size over a long period of time, it is a strong indication that there are not enough workers to handle a normal workload. Based on the size of the queue and/or some other possible metrics such as average task completion time and rate of growth for the queue, the server 225 can estimate how many more workers are needed to handle the workload and spin them up directly, or notify an administrator with the suggested number of workers to add. Similarly, if the task queue is consistently empty, it may be an indication that there are more workers running than required to handle the normal workload. Based on metrics like the average time a task stays in the queue before being taken by a worker, the server 225 can estimate how many workers are actually required and either shut down some running workers or notify an administrator with the suggested number of workers to shut down. Thus, server 225 may monitor metrics such as average queue length and average time to complete node level tasks, and may then determine an appropriate number of workers based on these metrics. The server 225 may then increase or decrease the number of available workers accordingly.

Periodically updates for plugins used by provisioners 230A-230N are created. Additionally or alternatively, new plugins may be added to the provisioners, existing plugins may be removed from provisioners, and/or different plugin versions may be selected for provisioners. Server 225 and provisioners 230A-230N may coordinate with one another to synchronize plugins, data user by plugins and/or other resources of the provisioners. In one embodiment, planner 255 sends an update message to provisioners 230A-230N that causes the provisioners to pause some or all tasks and/or to stop taking new tasks. The plugins and/or the data used by the plugins in the provisioners 230A-230N may then be updated. Once the update is complete, the provisioners may resume existing tasks and/or resume receiving new tasks.

In one embodiment, there are different classes of provisioners 230A-230N. Each provisioner class may be responsible for a subset of possible node level tasks. For example, provisioner 230A may be responsive for creating and deleting nodes and provisioner 230B may be responsible for installing, configuring, starting, etc. services. In such an embodiment, provisioners of a first class may have different plugins from provisioners of a second class.

If multiple classes of provisioners are used, planner 255 may determine class of a provisioner requesting a task, and assign an appropriate task based on the provisioner task. In one embodiment, to ensure that appropriate tasks are assigned to provisioners, separate queues are maintained for tasks associated with different provisioner classes. Alternatively, flags may be included in task entries in a queue, where the flags indicate a provisioner class that may be assigned to the tasks.

In one embodiment the server 225 is a multi-tenant server. Accordingly, a single instance of the server 225 may be presented to multiple tenants as if the server manages clusters only for that tenant. Server 225 may divide resources and apportion percentages of those resources to each tenant. Each tenant may be guaranteed that resources of the server 225 will meet specified quality of service and availability constraints specified by the tenant. Accordingly, solver 250 and planner 255 may each concurrently perform respective operations of creating a cluster layout and creating an execution plan for multiple tenants.

For embodiments in which multi-tenancy is implemented, a separate task queue may be maintained for each tenant. Additionally, each tenant may have its own cluster templates, hardware types, image types, services, and plugins. The cluster entities, clusters, users, task queues, etc. of one tenant are not viewable to another tenant. Thus, each tenant may be completely unaware of the fact that the server 225 is serving multiple different tenants.

Each tenant can select which plugins they want to use for provisioners. Since provisioners associated with a first tenant may differ from provisioners associated with a second tenant (due to having different plugins), each plugin instance is assigned to a particular tenant.

In an example, server 225 may receive a first cluster management operation request from a first tenant and concurrently receive a second cluster management operation from a second tenant. The solver 250 may separately determine a first cluster layout for the first cluster management operation and a second cluster layout for the second cluster management operation. The planner 255 may then separately determine a first execution plan for the first cluster management operation and a second execution plan for the second cluster management operation. The planner 255 may populate a first task queue with node level tasks of the first execution plan for the first tenant and may populate a second task queue with node level tasks of the second section plan for the second tenant. The planner 255 may then coordinate with a first set of provisioners assigned to the first tenant for carrying out the first cluster management operation and may at the same time coordinate with a second set of provisioners assigned to the second tenant for carrying out the second cluster management operation. Throughout all of these steps, the first tenant is not aware of the work being performed for the second tenant and the second tenant is not aware of the work being performed for the first tenant.

Figure 3A:
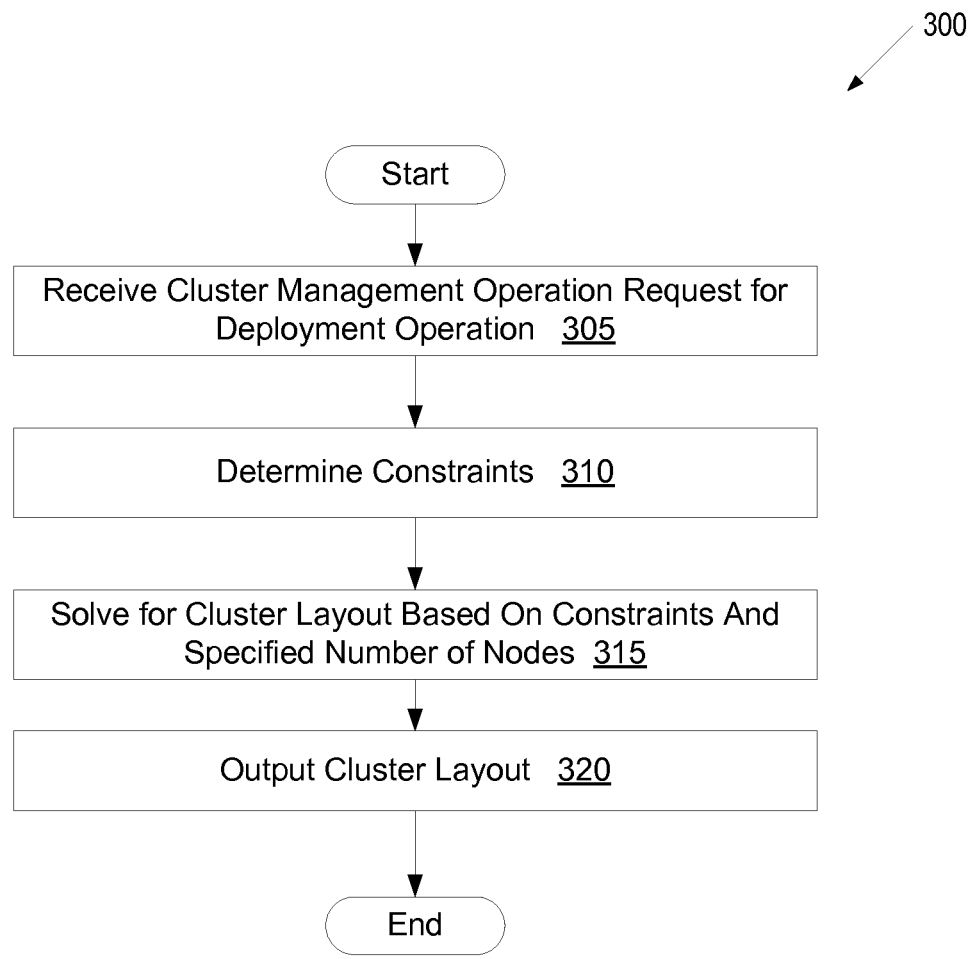
FIG. 3A is a flow diagram of one embodiment for a method of determining a cluster layout for a new cluster.
Figure 3B:
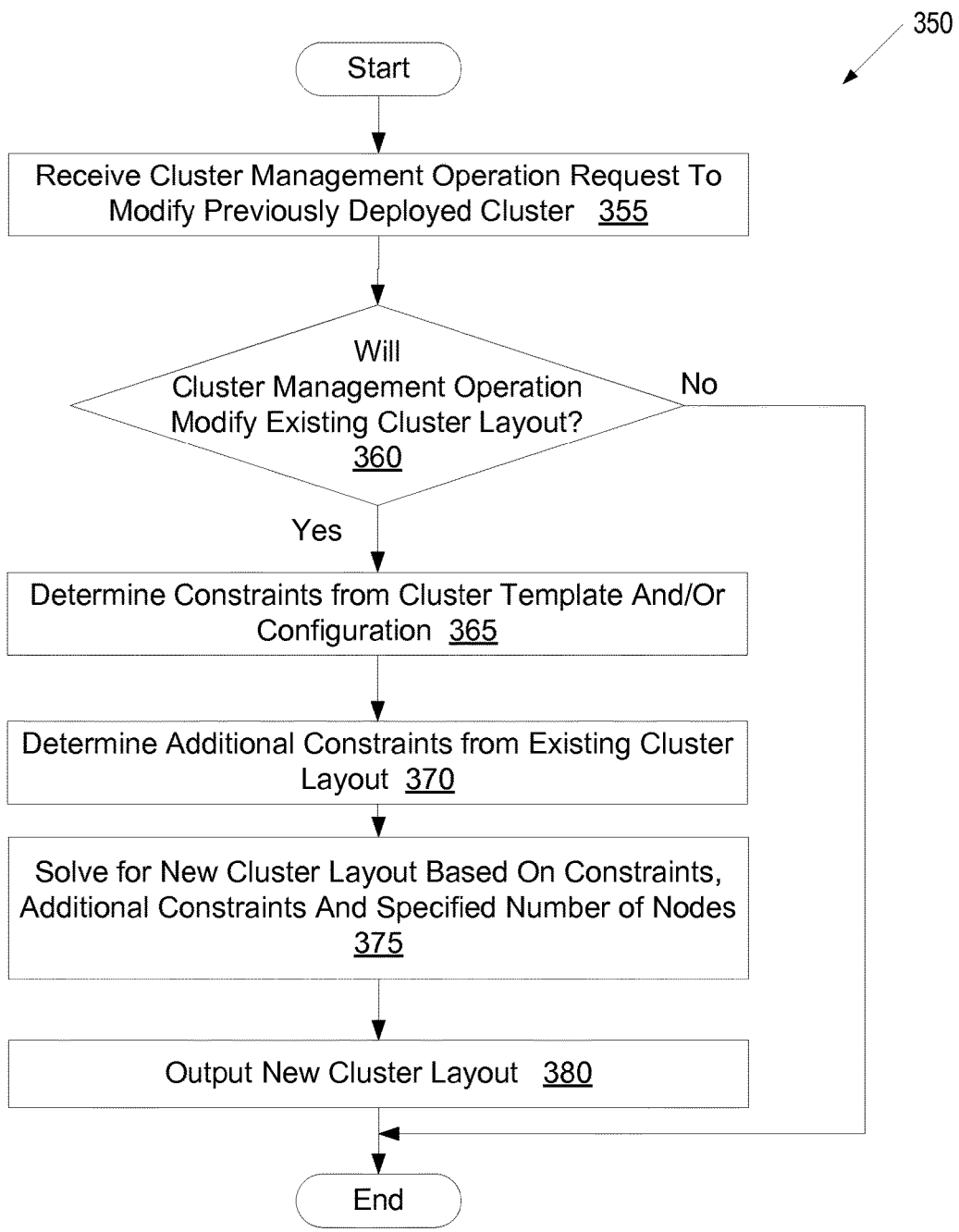
FIG. 3B is a flow diagram of one embodiment for a method of determining a new cluster layout for an existing cluster.

FIGS. 3A-3B are flow diagrams of various embodiments of methods for solving for a cluster layout. The methods are performed by processing logic that may include hardware (circuitry, dedicated logic, etc.), software (such as is run on a general purpose computer system or a dedicated machine), firmware, or some combination thereof. In one implementation, the methods may be performed by a server computing device 105 of FIG. 1 (e.g., solver 150 of a server 125 running in server computing device 105).

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

FIG. 3A is a flow diagram of one embodiment for a method 300 of determining a cluster layout for a new cluster. At block 305 of method 300, processing logic receives a cluster management operation request for a deployment operation. The cluster management operation request may include a cluster template and a specified number of nodes to include in the created cluster. The cluster management operation request may additionally include a configuration file. The configuration file may include additional constraints beyond those included in the cluster template and/or may include properties (e.g., for services, image types, hardware types, specific constraints, etc.) that override those of the cluster template.

At block 310, processing logic determines constraints that should be followed for the cluster management operation. These constraints may include a set of layout constraints and/or a set of service constraints. The constraints may be determined from the cluster template and/or the provided configuration data.

At block 315, processing logic solves for a cluster layout based on the determined constraints and the provided number of nodes. At block 320, processing logic then outputs the created cluster layout. This cluster layout may then be sent to a planner and used to automatically provision a new cluster having the cluster layout.

FIG. 3B is a flow diagram of one embodiment for a method 350 of determining a new cluster layout for an existing cluster. At block 355 of method 350, processing logic receives a cluster management operation request to modify a previously deployed cluster. Examples of such requests include requests to add nodes, to add services to existing nodes, to delete nodes, to remove services from nodes, to update services, and so on.

At block 360, processing logic determines whether the cluster management operation will modify an existing cluster layout of the cluster. Cluster management operations that will not modify the cluster layout may be sent directly to a planner without solving for a new cluster layout. Cluster management operations that will cause the cluster layout to change are sent to a solver so that the solver can solve for a new target cluster layout.

At block 365, processing logic determines constraints from a cluster template included in the cluster management operation request and/or in configuration data provided with the cluster management operation request. At block 370, processing logic also determines additional constraints from the existing cluster layout. Modifying the existing cluster layout could cause an interruption of an already deployed multi-tiered application. However, by using the existing cluster layout to define additional constraints, processing logic ensures that only minimal changes will be made to the existing cluster layout (e.g., only changes that need to be made in view of new constraints, thus minimizing or eliminating such an interruption.

At block 375, processing logic solves for a new cluster layout based on the constraints, the additional constraints and the number of nodes specified in the cluster management operation request. At block 380, processing logic outputs the new cluster layout. Processing logic may also output the starting (preexisting) cluster layout). A planner may then determine a sequence of node level operations that should be performed to transition the cluster from the starting cluster layout to the new (target) cluster layout.

FIG. 4 is a block diagram of one example of finding valid service sets to satisfy a cluster management operation for a cluster. In one embodiment, the first stage in solving for a valid cluster layout is to solve for all of the valid service sets for the cluster. A service set is a set of services that can be placed on a node, and may be solved based on layout constraints 415. The valid service sets will depend on the services that should be placed on the cluster, as well as the layout constraints 415 defined in the cluster template.

In an example, we define N as the number of services that must be placed on the cluster, and n as the number of services in a particular service set. For each n from 1 to N, the solver goes through every possible service combination and checks if the service combination is valid, given the constraints defined in the cluster template. If the service set is valid, it is added to the list of valid service sets 430.

An example of solving for valid service sets 430 for a cluster with three serves (s1, s2 and s3) services is shown in FIG. 4. In this example, there are three layout constraints 415. The constraints include a "must coexist" constraint for s1 and s3, a "cannot coexist" constraint for s1 and s2 and a "cannot coexist" constraint for s2 and s3.

We start with a first service set of three services (n=3), which has only one combination {s1,s2,s3} 405. This first service set 405 is invalid because it violates the constraint that s1 cannot coexist with s2, so it is not added to the valid service sets 430. Next the solver moves on to service sets with two services (n=2), which has three combinations. Of these, service set {s1, s2} 406 is invalid because s1 cannot coexist with s2. Service set {s1, s3} 407 is valid because it satisfies all the constraints 415. Accordingly service set {s1, s3} 407 is added to the valid service sets 430. Service set {s2, s3} 408 is invalid because s2 cannot coexist with s3.

Finally, the solver moves on to service sets that include only a single service (n=1), which has 3 possibilities. Service set {s1} 409 is invalid because s1 must coexist with s3. Service set {s2} 410 is valid because it satisfies all the constraints, and so is added to the valid service sets 430. Service set {s3} 411 is invalid because s1 must coexist with s3. Thus, we end up with two valid service sets in this scenario, {s1, s3} and {s2}. If there are no valid service sets, there is no solution and the cluster operation fails.

FIG. 5 is a block diagram of one example of finding valid node layouts to satisfy a cluster management operation. In one embodiment, the second stage in solving for a valid cluster layout is to solve for all of the valid node layouts for the cluster. A node layout describes a node and consists of a service set, hardware type, and image type. The goal in this stage is to take the valid service sets from the previous stage and find all valid node layouts that can be used in the cluster.

For each valid service set, each combination of service set, hardware type, and image type is examined. If the node layout satisfies all service constraints 520, it is added to a valid node layout 530. After that, if there are multiple valid node layouts for a service set, one valid node layout is chosen for a final node layout 540 and the others are discarded.

In one embodiment, which node layout is chosen is determined by a comparator that compares node layouts. In this embodiment, the comparator deterministically chooses a node layout based on preferred image and hardware types in order to ensure that the same image is chosen across the entire cluster when possible, and to prefer cheaper hardware when possible. In one embodiment, the comparator is a pluggable component, so different users can define their own comparator to match their needs.

In the example shown in FIG. 5, there are two hardware types that can be used: hw1 and hw2. Also, there are two image types that can be used: img1 and img2. The starting valid service sets {s1, s3} 407 and {s2} 410 are taken from the previous example. Every possible node layout (combination of service set, hardware type and image type) is examined. Since there are two hardware types and two image types, this means there are four possible node layouts for each service set. Service set {s1, s3} 407 includes node layouts 502-508 and service set {s2} 410 includes node layouts 510-516.

Each node layout 510-516 is checked against the service constraints 520. In this example, the service constraints 520 specify that s1 must be placed on a node with hw1, and s2 must be placed on a node with img1. After each possible node layout 502-516 is examined, the solver ends up with four valid node layouts. The valid node layouts are <{s1, s3}, hw1, img1> 502, <{s1, s3}, hw1, img2> 504, <{s2}, hw1, img1> 510, and <{s2}, hw2, img1> 514. There are two valid node layouts for each service set, which enables the solver to narrow down the final set until we end up with two final node layouts <{s1, s3}, hw1, img1> 502 and <{s2}, hw2, img1> 514. One layout is then chosen deterministically (e.g., by a pluggable comparator).

FIG. 6 is a block diagram of one example of finding a valid cluster layout to satisfy a cluster management operation. In one embodiment, the final stage in solving for the cluster layout is to use the solved valid service sets and the solved valid node layouts to determine one or more valid cluster layouts.

After the final set of node layouts is determined, the solver finds how many of each node layout there should be based on the number of nodes in the cluster. It does this by first ordering the node layouts by preference, then searching through every possible cluster layout until it finds a cluster layout that satisfies all constraints 615. The search is done in a deterministic fashion by trying to use as many of the more preferred node layouts as possible. Again the preference order may be determined using a pluggable comparator.

In the illustrated example, the cluster will have five nodes, and there is a first constraint that s1 must only be placed on one node, and a second constraint that there must be at least one node with s2. The comparator decides that the node layout with s1 and s3 is preferred over the node layout with just s2. The search then begins with as many of the first node as possible. At each step, if the current cluster layout is invalid, a single node is taken away from the most preferred node and given to the next most preferred node. The search continues in this way until a valid cluster layout is found, or until the search space is completely exhausted. In embodiments, there are some search optimizations that may occur.

In the example, there can only be, at most, one node of the first node layout since there can only be one node with s1. Solver can therefore skip ahead to a cluster layout with only one of the first node layout and continue searching from there. Once a valid cluster layout has been found, it is sent to the planner 620 to determine what node level tasks should be performed to execute the cluster operation. If no valid cluster layout is found, the operation fails.

It should be noted that the above examples only illustrate a small number of constraints, whereas many more constraints are possible. In fact, when shrinking and expanding a cluster, or when removing or adding services from an existing cluster, the current cluster itself may be used as a constraint. That is, in one embodiment the hardware and image types on existing nodes should not change and are enforced as constraints. Similarly, services uninvolved in the cluster operation are not allowed to move to a different node in embodiments. Thus, when a cluster is expanded, for example, the current nodes in the cluster may be unchanged.

Figure 7:
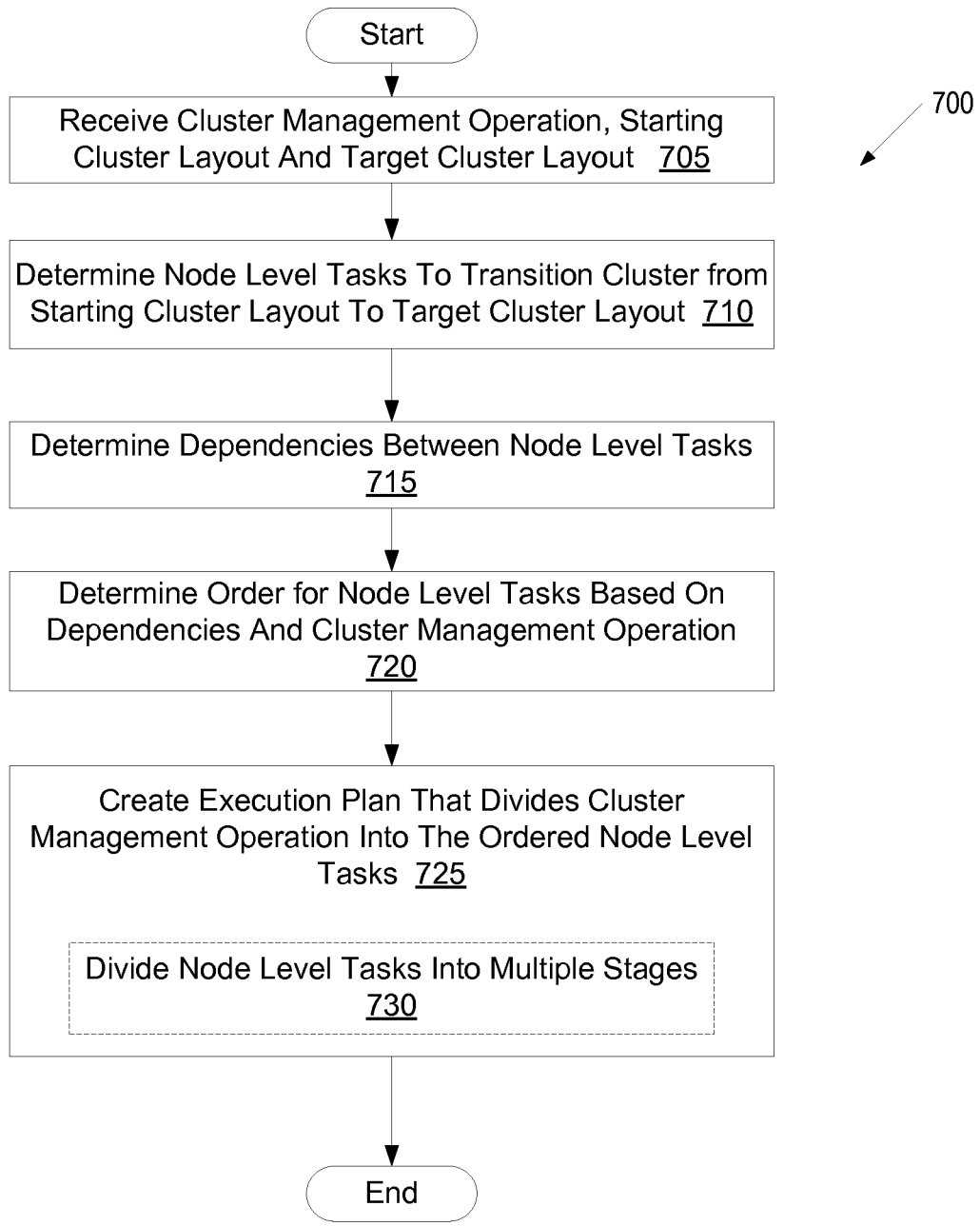
FIG. 7 is a flow diagram of one embodiment for a method of determining a set of node level tasks to implement a cluster management operation.
Figure 8:
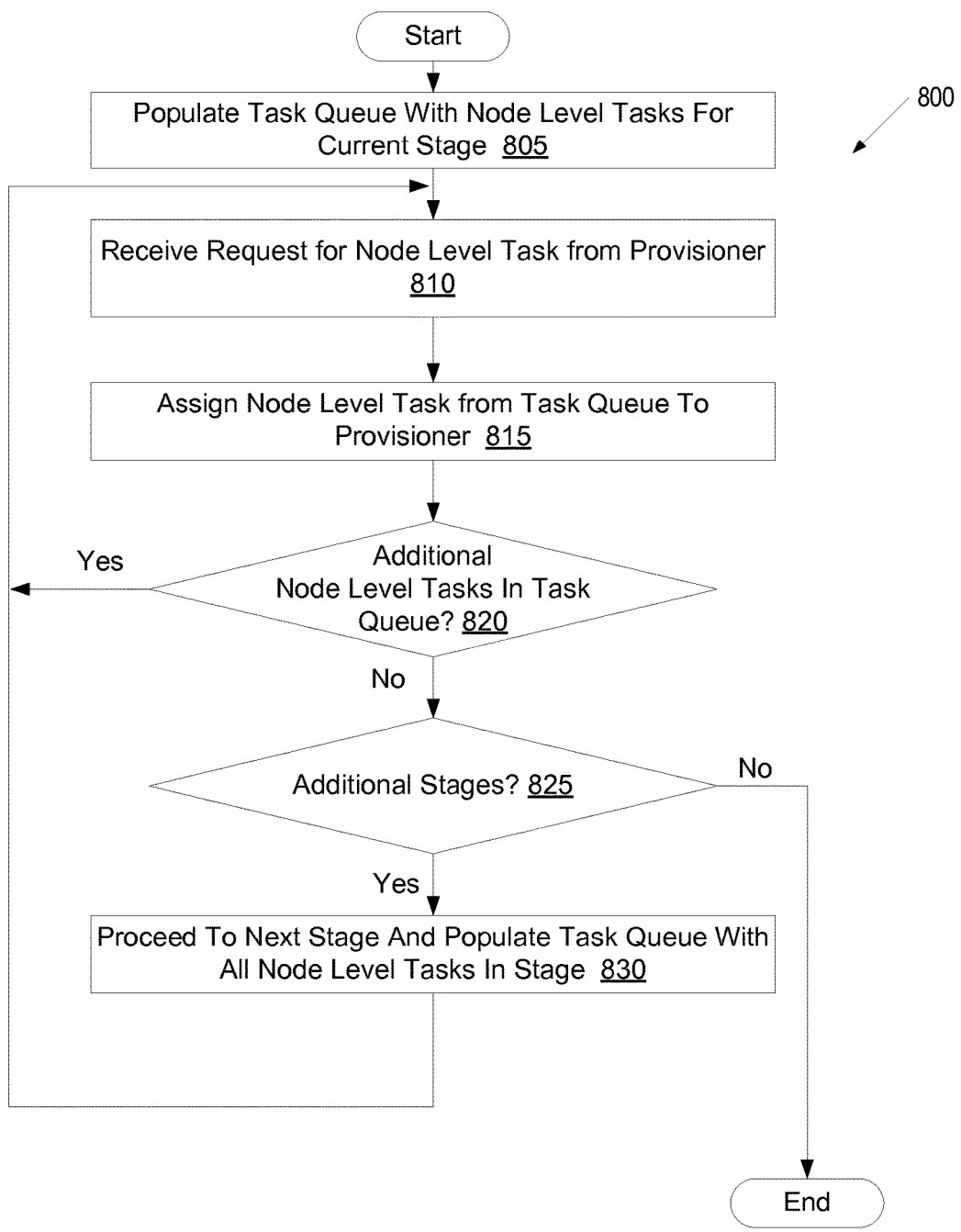
FIG. 8 is a flow diagram of one embodiment for a method of assigning node level tasks to provisioners to implement a cluster management operation.
Figure 9:
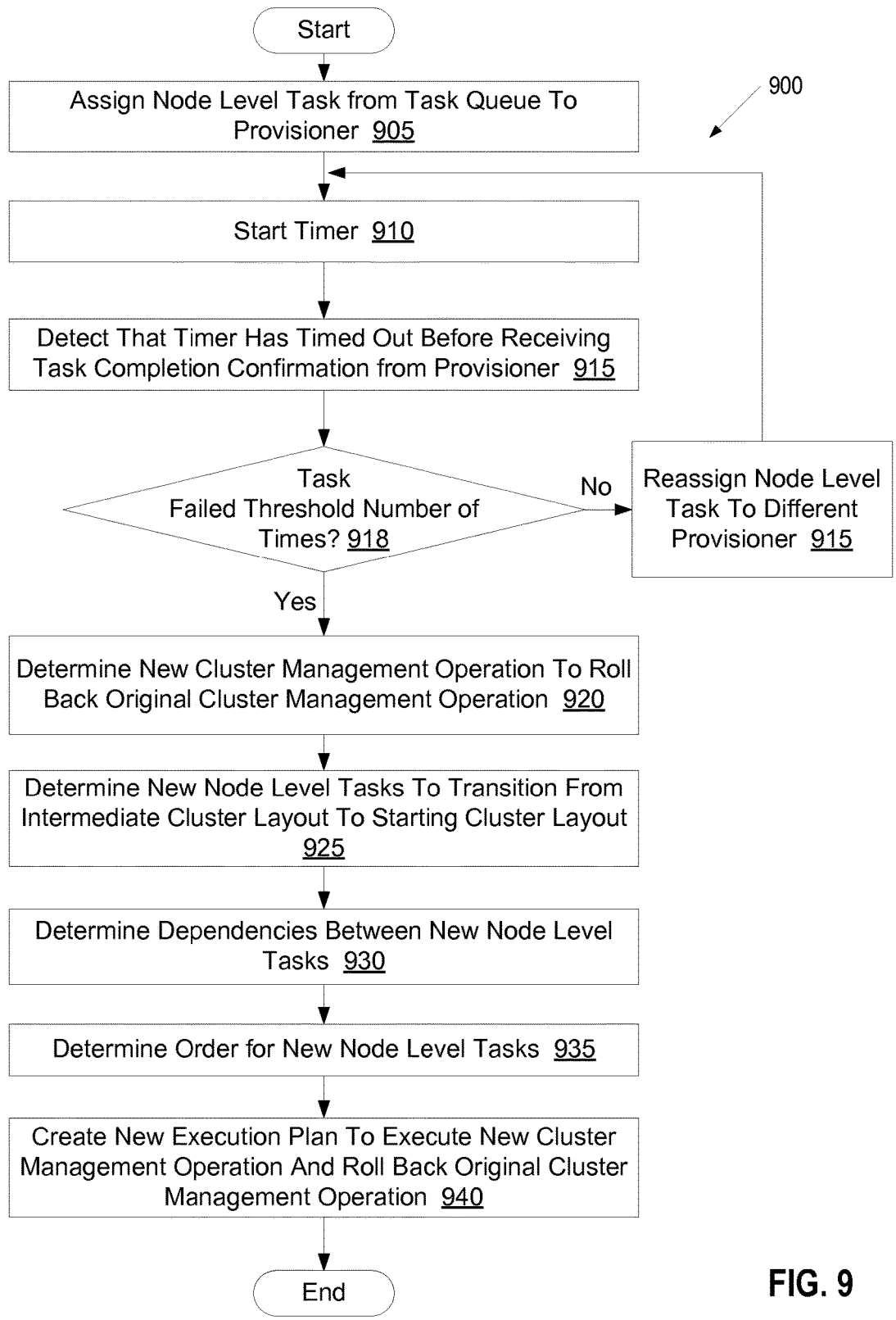
FIG. 9 is a flow diagram of one embodiment for a method of rolling back a failed cluster management operation.

FIGS. 7-9 are flow diagrams of various embodiments of methods for generating an execution plan for implementing a cluster management operation and coordinating with provisioners to perform the execution plan. The methods are performed by processing logic that may include hardware (circuitry, dedicated logic, etc.), software (such as is run on a general purpose computer system or a dedicated machine), firmware, or some combination thereof. In one implementation, the methods may be performed by a server computing device 105 of FIG. 1 (e.g., planner 155 of a server 125 running in server computing device 105).

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

FIG. 7 is a flow diagram of one embodiment for a method 700 of determining a set of node level tasks to implement a cluster management operation. At block 705 of method 700, processing logic receives a cluster management operation for a cluster, a starting cluster layout and a target cluster layout. Processing logic may receive such data from a solver, from memory, or from a persistent data store.

At block 710, processing logic determines node level tasks that can be performed to transition the cluster from the starting cluster layout to the target cluster layout. Such node level tasks may include, for example, create node, install service, configure service, initialize service, start service, and so on.

At block 715, processing logic determines dependencies between the node level tasks. For example, an install service task may depend on a create node task and/or on another install service task, on an configure service task, and so on. At block 720, processing logic determines an order for the node level tasks based on the dependencies and the cluster management operation. The same tasks may have different orders based on different cluster management operations. For instance, in one embodiment when starting all services on a cluster, if service A depends on service B, service B must be started before service A is started. However, in one embodiment when stopping all services on a cluster, service A must be stopped before service B is stopped. In the first operation (start), the dependency between service A and service B results in the task for service B occurring before the task for service A. In the second operation (stop), the dependency results in the task for service A occurring before the task for service B.

At block 725, processing logic creates an execution plan that divides the cluster management operation into the ordered node level tasks. In one embodiment, the execution plan is a directed acyclic graph (DAG) of the node level tasks. The DAG may show numerous tasks that can be run in parallel as well as tasks that should be run in sequence. In one embodiment, processing logic divides the node level tasks into stages (block 730). All node level tasks in a particular stage may be performed concurrently, and the order in which any of these node level tasks are started or completed may be unimportant.

FIG. 8 is a flow diagram of one embodiment for a method 800 of assigning node level tasks to provisioners to execute an execution plan to implement a cluster management operation. Note that method 800 is described for a system that has divided node level tasks into a series of stages. In alternative embodiments, node level tasks may be added to task queues and assigned without dividing these tasks into stages. In such an embodiment, the order in which node level tasks are placed in the queue and the order in which the node level tasks may be important. For example, if a first node level task has a dependency on a second node level task, then that second node level task should be placed in the task queue before the first node level task. By not dividing the node level tasks into stages, execution of the node level tasks may be completed more quickly at the possible expense of increased complexity in management of the tasks.

At block 805, processing logic populates a task queue with node level tasks for a current stage. At block 810, processing logic receives a request for a node level task from a provisioner. Alternatively, processing logic may proactively identify an idle provisioner and assign a node level task to that provisioner without waiting for the provisioner to request a task.

At block 815, processing logic assigns a node level task from the task queue to the provisioner. Alternatively, processing logic may make the task queue visible to provisioners, and provisioners may select node level tasks from the task queue. In such an embodiment, the provisioners may notify a planner that they have selected a particular node level task.

At block 820, processing logic determines if there are any additional node level tasks in the task queue. If so, the method returns to block 810 so that processing logic can assign additional node level tasks from the task queue to provisioners. If there are no node level tasks left in the task queue, and all provisioners have reported completion of their assigned node level tasks, then all of the node level tasks of a current stage have been completed. Accordingly, the method proceeds to block 825.

At block 825, processing logic determines whether there are any additional stages in the execution plan. If there are not additional stages, then the cluster management operation has been completed, and the method ends. If there are additional stages, then the method continues to block 830 and processing logic proceeds to the next stage in the execution plan. At this point processing logic populates the task queue with the node level tasks in the new stage, and then returns to block 810 to assign the tasks.

As previously mentioned, a transaction manager may manage a cluster management operation as a transaction. Thus, a log may be created for each of the node level tasks that are performed to execute the cluster management operation. If at any point during execution of the cluster management operation a node level task fails, then the entire cluster management operation may in turn fail. It may then be desirable to roll back the cluster management operation to a starting state of the cluster before the cluster management operation was performed.

FIG. 9 is a flow diagram of one embodiment for a method 900 of rolling back a failed cluster management operation. At block 905 of method 900, processing logic assigns a node level task from a task queue to a provisioner. At block 910, processing logic starts a timer. The timer may be used to determine if a provisioner has stalled or crashed during execution of a node level task. At block 915, processing logic determines whether the timer has timed out (e.g., a threshold amount of time has passed since the node level task was assigned). Responsive to detecting such an occurrence, the method proceeds to block 918.

At block 918, processing logic determines whether the node level task has failed a threshold number of times. A node level task that has failed more than once may be indicative of a problem with the task itself rather than with a particular provisioner that was assigned the task. If the node level task has failed the threshold number of times (e.g., once, twice, five times, etc.), the method continues to block 920. If the node level task has not yet failed the threshold number of times, the method proceeds to block 915 and the node level task is reassigned to a different provisioner.

At block 920, processing logic determines a new cluster management operation to roll back the original cluster management operation. At block 925, processing logic determines new node level tasks to transition from an intermediate cluster layout to the starting cluster layout. The intermediate cluster layout represents a state of the cluster at the time that the node level task failed. The intermediate cluster layout may not match either the starting cluster layout or the target cluster layout.

At block 930, processing logic determines dependencies between the new node level tasks. At block 935, processing logic determines an order of the new node level tasks. At block 940, processing logic creates a new execution plan to execute the new cluster management operation and roll back the original cluster management operation. The new node level tasks may be inverses of original node level tasks that were executed as part of the execution plan to transition the cluster from the starting cluster layout to the target cluster layout. Some node level tasks in the execution plan may not need to be undone or redone. For example, a restart node level task that was performed as part of the execution plan may not have an inverse that needs to be performed to roll back the cluster management operation. Accordingly, the new execution plan may not simply be an inverse of the original execution plan.

Figure 10:
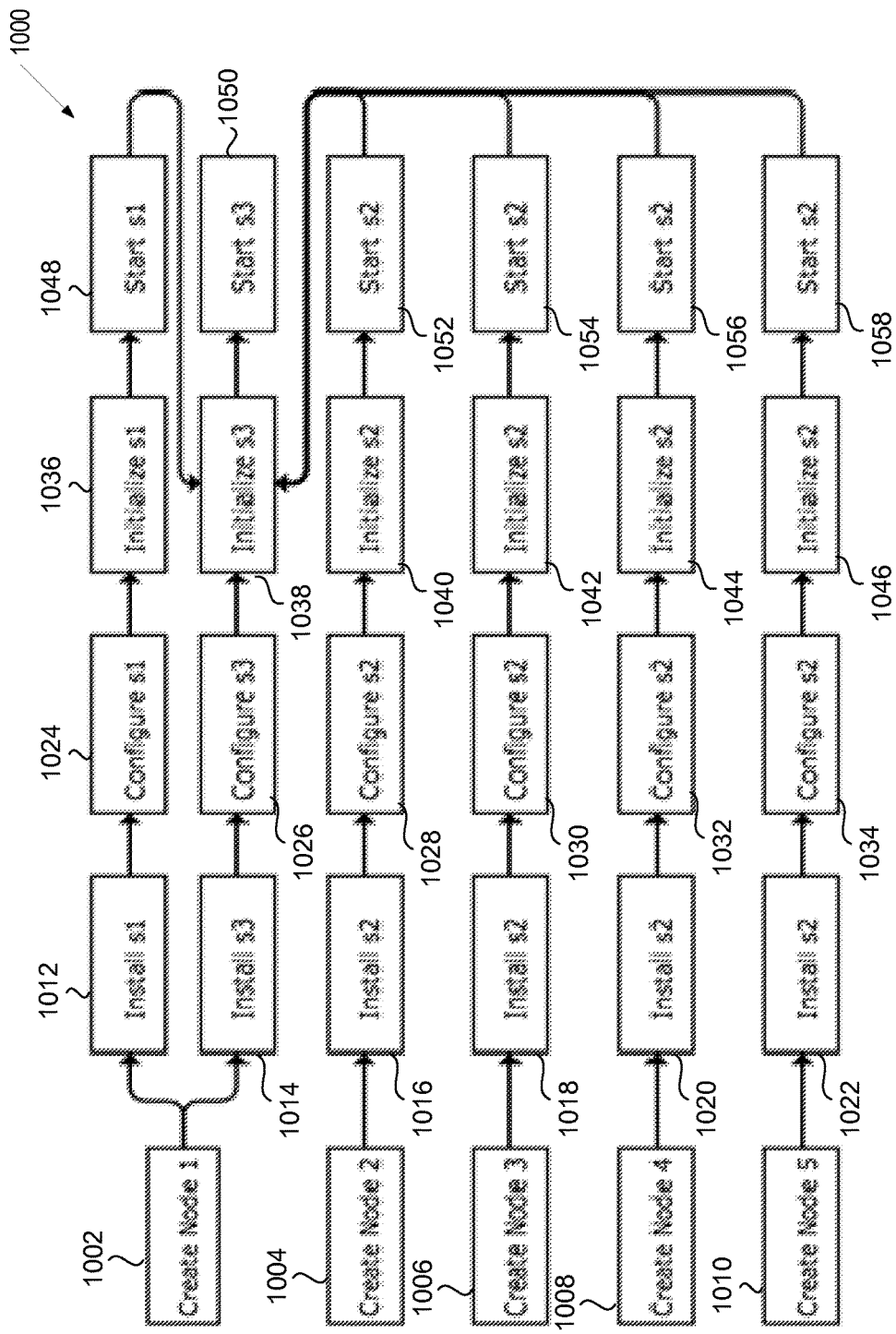
FIG. 10 is an example directed acyclic graph of node level tasks for cluster management operation.

FIG. 10 is an example directed acyclic graph (DAG) 1000 of node level tasks for a cluster management operation. In one embodiment, for a cluster create operation, each node must be created, then each service on it must be installed, then configured, then initialized, then started. In this example, service s3 depends on both service s1 and service s2. Neither service s1 nor service s2 depend on any other service. Since service s3 depends on both service s1 and service s2, the initialize service s3 task cannot be performed until all services s1 and s2 on all other nodes in the cluster have been started. There are, however, no dependencies required for installation and configuration of services in the provided example.

Accordingly, the DAG 1000 starts with node level tasks of create node 1 1002, create node 2 1004, create node 3 1006, create node 4 1008 and create 5 1010. The node level tasks of install service s1 1012 and install service s3 1014 follow from create node 1 1002. The node level task of install service s2 1016 follows from create node 2 1004. The node level task of install service s2 1018 follows from create node 3 1006. The node level task of install service s2 1020 follows from create node 4 1008. The node level task of install service s2 1022 follows from create node 5 1010.

The node level task of configure service s1 1024 follows from the node level task of install service s1 1012. The node level task of configure service s3 1026 follows from the node level task of install service s3 1014. The node level task of configure service s2 1028 follows from the node level task of install service s2 1016. The node level task of configure service s2 1030 follows from the node level task of install service s2 1018. The node level task of configure service s2 1032 follows from the node level task of install service s2 1020. The node level task of configure service s2 1034 follows from the node level task of install service s2 1022.

The node level task of initialize service s1 1036 follows from the node level task of configure service s1 1024. The node level task of initialize service s2 1040 follows from the node level task of configure service s2 1028. The node level task of initialize service s2 1042 follows from the node level task of configure service s2 1030. The node level task of initialize service s2 1044 follows from the node level task of configure service s2 1032. The node level task of initialize service s2 1046 follows from the node level task of configure service s2 1034.

The node level task of start service s1 1048 follows from the node level task of initialize service s1 1036. The node level task of start service s2 1052 follows from the node level task of initialize service s2 1040. The node level task of start service s2 1054 follows from the node level task of initialize service s2 1042. The node level task of start service s2 1056 follows from the node level task of initialize service s2 1044. The node level task of start service s2 1058 follows from the node level task of initialize service s2 1046.

The node level task of initialize service s3 1038 depends from node level task configure service s3 1026, start service s1 1048, start service s2 1052, start service s2 1054, start service s2 1056 and start service s2 1058. Start service s3 1050 then follows from the node level task of initialize service s3 1038.

In the above example, many of the tasks can be performed in parallel, while some tasks can only be performed after others have completed. For example, all of the create node tasks 1002-1010 can be done in parallel, but the install s2 task on node 2 1016 can only be done after the create node 2 task 1004 has completed successfully. In one embodiment, the planner takes the DAG and divides it into stages based on what can be done in parallel.

Figure 11:
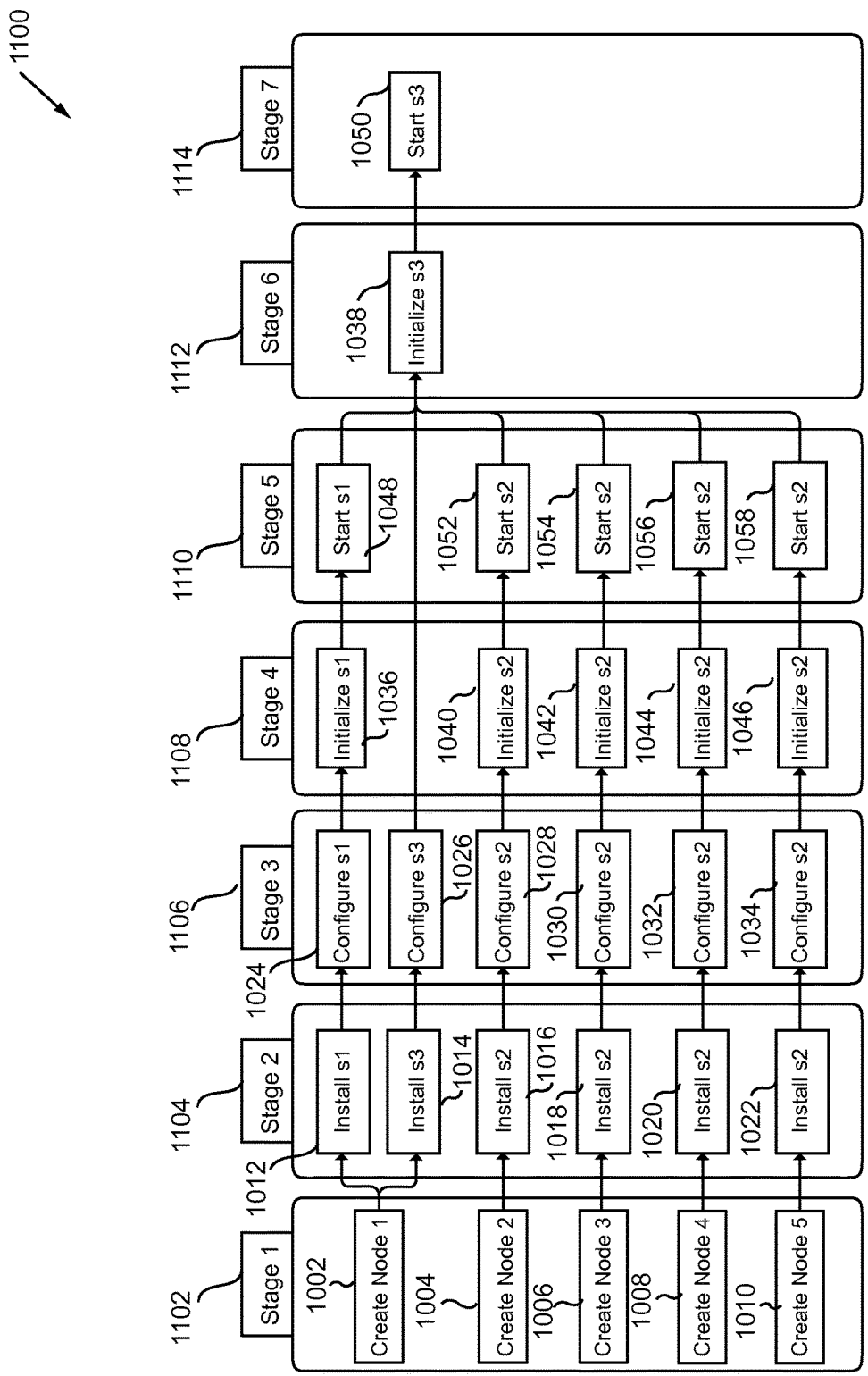
FIG. 11 is a first example of a collection of node level tasks for a cluster management operation divided into a sequence of stages.

FIG. 11 is a first example 1100 of a collection of node level tasks for a cluster management operation divided into a sequence of stages. In one embodiment, the planner identifies "sources" in the DAG, where sources are node level tasks that do not depend on any other node level tasks in the DAG. The planner groups all sources into a first stage, and removes all sources and their edges. The resultant DAG does not include the node level tasks that were added to the first stage (or their edges), and so has new sources. Thus, the planner identifies the new sources, and groups them into a stage. The planner then removes these sources and their edges from the DAG. This process repeats in a loop until all tasks are gone from the DAG.

For example, in the first iteration, all the create node tasks 1002-1010 are sources and are therefore grouped into a first stage 1102. Once the create node tasks and their edges are removed from the DAG, the next iteration begins. In one embodiment, all the install tasks 1012-1022 are identified as sources and grouped together into a second stage 1104. All configure node tasks 1024-1034 are included in a third stage 1106. The initialize s1 task 1036 and all initialize s2 tasks 1040-1046 are grouped into a fourth stage 1108. The start s1 task 1048 and all start s2 tasks 1052-1058 are grouped into a fifth stage 1110. A sixth stage 1112 is created for the initialize s3 task. A seventh stage 1114 is created for the start s3 task 1050.

Figure 12:
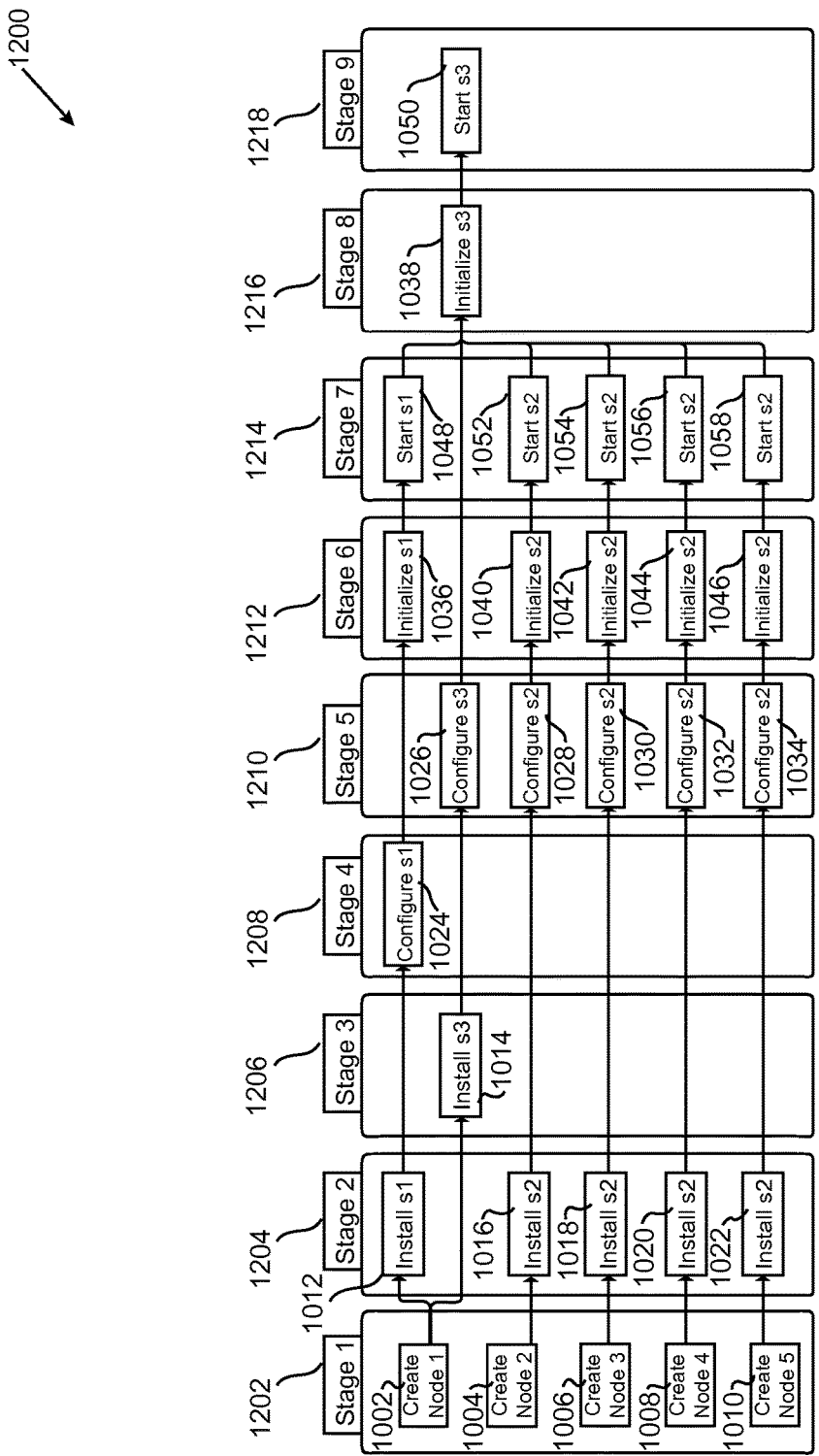
FIG. 12 is a second example of a collection of node level tasks for a cluster management operation divided into a sequence of stages.

FIG. 12 is a second example 1200 of a collection of node level tasks for a cluster management operation divided into a sequence of stages. In one embodiment, the planner ensures that there is only one task for a given node in a stage. In the above example 1100, the second stage 1104 has the install s1 task 1012 and the install s3 task 1014 that both need to be performed on node 1. To ensure that only one task is performed for a given node in a stage, these tasks are therefore split into separate stages as shown in example 1200.

In example 1200, the first stage 1202 includes all create node tasks 1002-1010. The second stage 1204 includes the install s1 task 1012 and all install s2 tasks 1016-1022. The third stage 1206 includes the install s3 task 1014. The fourth stage 1208 includes the configure s1 task 1024. The fifth stage 1210 includes the configure s3 task 1026 and all configure s2 tasks 1028-1034. The sixth stage 1212 includes the initialize s1 task 1036 and all initialize s2 tasks 1040-1046. The seventh stage 1214 includes the start s1 task 1048 and all start s2 tasks 1052-1058. The eighth stage 1216 includes the initialize s3 task 1038. The ninth stage 1218 includes the start s3 task 1050.

Each task in a stage can be performed concurrently, and in one embodiment all tasks in a stage must be completed before moving on to the next stage. That is, tasks in stage i+1 are not performed until all tasks in stage i have completed successfully. Note that this staged approach is not the only way to coordinate execution of the tasks. For example, from the original DAG, there is nothing wrong with performing the install s2 task on node 2 once the create node 2 task has completed, but the staged approach will wait until all other create node tasks have completed before performing the install s2 task. Execution order and parallelization can be done in many ways; this is just one way to do it.

Figure 13:
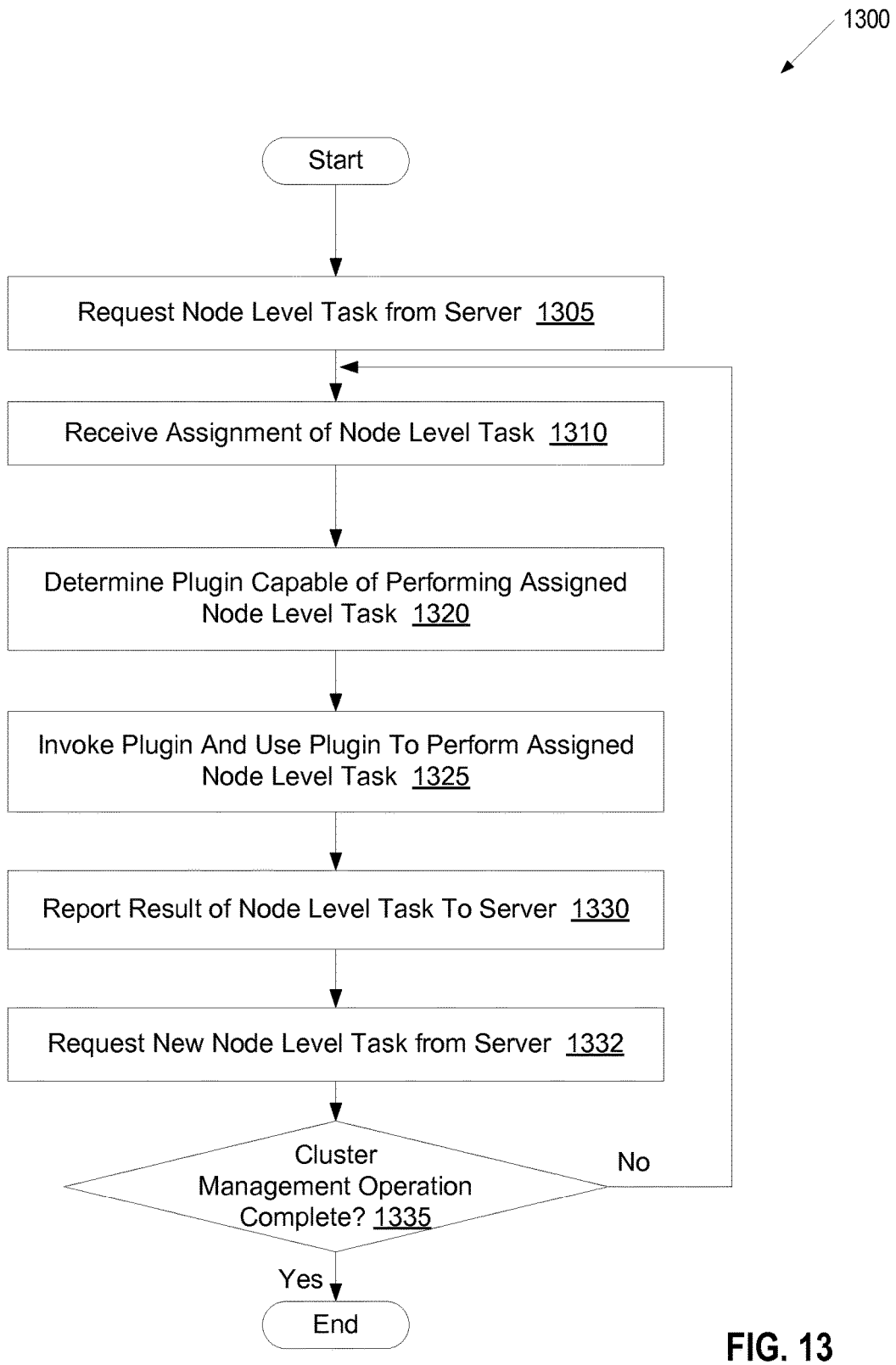
FIG. 13 is a flow diagram of one embodiment for a method of performing node level tasks by a provisioner.

FIG. 13 is a flow diagram of one embodiment for a method 1300 of performing node level tasks by a provisioner. Method 1300 may be performed by processing logic that may include hardware (circuitry, dedicated logic, etc.), software (such as is run on a general purpose computer system or a dedicated machine), firmware, or some combination thereof. In one implementation, method 1300 may be performed by a server computing device 105 of FIG. 1 (e.g., a provisioner 130A-130N running in server computing device 105).

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

At block 1305 of method 1300, processing logic requests a node level task from a server (e.g., from a planner of the server). At block 1310, processing logic receives an assignment of a node level task from the server. Alternatively, processing logic may access a task queue and select an available task from the task queue. In such an instance, processing logic may notify the server of the selected node level task.

At block 1320, processing logic determines a plugin capable of performing the assigned (or selected) node level task. At block 1325, processing logic invokes the plugin and uses the plugin to perform the assigned node level task. At block 1330, processing logic then reports a result (e.g., a success or failure) of the node level task to the server. Processing logic may also report appropriate metadata associated with a success or a failure.

At block 1332, processing logic requests a new node level task. At block 1335, if the cluster management operation is complete, then there are no additional tasks to be assigned and the method ends. If at block 1335 the cluster management operation is not complete, the method returns to block 1310, and a new node level task assignment is received.

Figure 14:
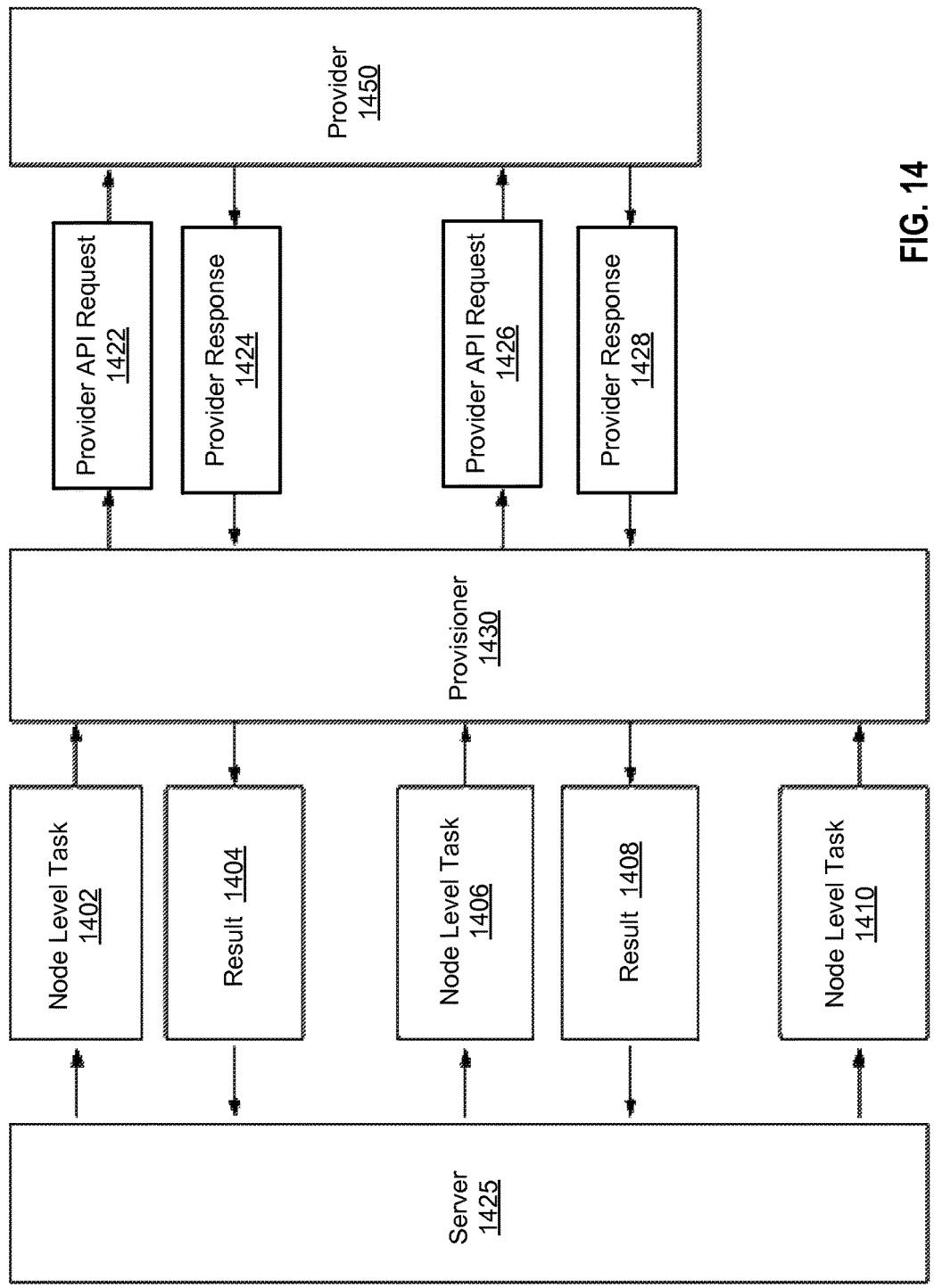
FIG. 14 is a block diagram of example communications between a server, a provisioner, and a provider for a cluster management operation.

FIG. 14 is a block diagram of example communications between a server 1425, a provisioner 1430, and a provider 1450 for a cluster management operation. As illustrated, in one embodiment provisioner 1430 first receives a node level task 1402, which may be a CREATE node task that instructs it to request a node from a specific provider. The CREATE node task contains one or more provider-specific options. These provider-specific options may include, for example, a specified task ID (e.g., 12345), a specified task name/type of "CREATE", a specified image type (e.g., for Ubuntu® Linux®), a specified hardware type (e.g., for a "small" host having minimal resources), and so on.

The provisioner 1430 then executes the node create request 1422 through a provider API for the specific provider 1450 and receives a provider response 1424 including the new node's provider ID (e.g., abc321) as a result. Since this provider ID will used for future operations against this node, provisioner 1430 may report 1404 the provider ID back to server 1425. This report may additionally include the task ID of the node level task and a status of the task. In one embodiment, the provider ID is reported by populating a "result" key-value hash in a task result JSON. The server 1425 may preserve these key-values in a "config" hash on all subsequent tasks for this node.

A subsequent node level task (e.g., a "CONFIRM" task) 1406 may then be sent from the server 1425 to the provisioner 1430. This subsequent node level task 1406 may include the provider ID for the node, the task ID and a task name, as well as additional information. Provisioner 1430 may then use the provider API to send a new provider API request 1426 as to the status of the node. Provider 1450 may then provide a provider response 1428 including a status of the node. The provider response 1428 may include an IP address of the node. The provisioner 1430 may then report a result 1408 obtained from the provider back to server 1425. This result may include the task ID, status, the IP address, and/or additional information.

Server 1425 may additionally assign a third node level task 1410 to provisioner 1430. The request for the third task 1410 may include all metadata discovered thus far about the node (e.g., the provider ID for the node and the IP address for the node). In this way, the server 1425 is building up a persistent payload of metadata about a node which can be used by any subsequent task. For example, many providers send back an identifier upon creation of a node. The "DELETE" task may use this provider specific identifier in order to tell the provider to delete the node. In this case, the "CREATE" task would send back the provider identifier in its payload so that the "DELETE" task can use it when it eventually runs. As another example, the IP address of a node may not be known until completion of the "CONFIRM" task. However, future services may need to be configured using the IP address, so provisioners can return the IP address in the payload to provide the information to future tasks.

In addition to this payload of key-value pairs, provisioner 1430 and/or server 1425 may also automatically provide additional metadata regarding cluster layout. For example, once the nodes of a cluster are established, server 1425 may include a "nodes" hash in a task JSON which contains the hostnames and IP addresses of every node in the cluster. This can be readily used by any task requiring cluster information. For example, node level tasks for configuring software on a node may need a list of all peer nodes in the cluster. Accordingly, such information may be included with such node level tasks.

Figure 15:
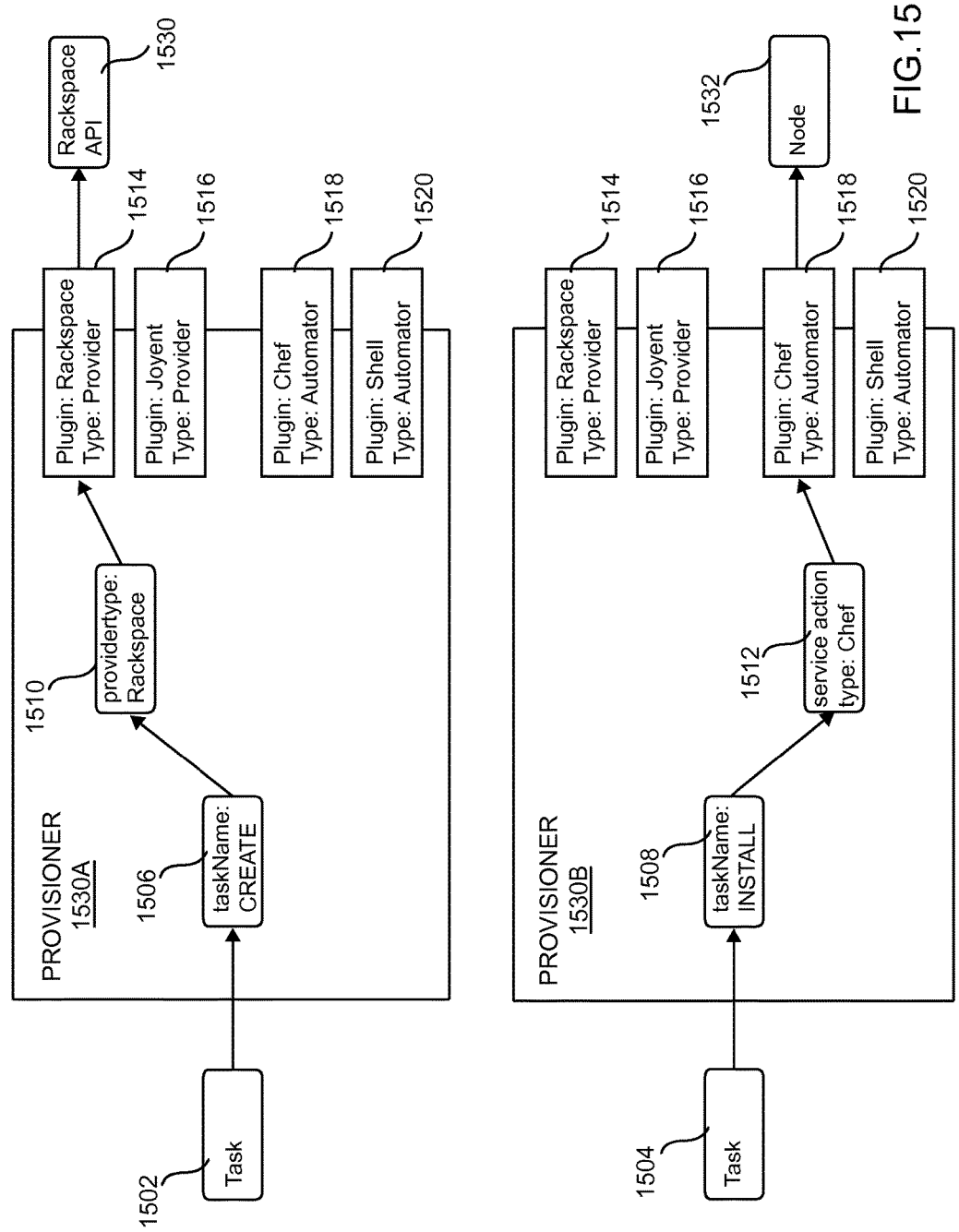
FIG. 15 is a block diagram of a provisioner, in accordance with one embodiment of the present invention.

FIG. 15 is a block diagram of two instances of a provisioner 1530A, 15306, in accordance with one embodiment of the present invention. In one embodiment, the cluster management system described in embodiments herein is agnostic to the type of cluster being managed. To achieve this, the provisioner 1530A-1530B makes extensive use of a plugin framework in one embodiment. Plugins allow the cluster management system to provision the same cluster in different providers. Plugins also allow an enterprise to customize implementation of their cluster services, for example integrating with their own software configuration management (SCM) system of choice.

A plugin is a self-contained program designed to perform a specific set of tasks. Plugins may be written in Ruby®, Javascript®, Perl®, or other languages. Each plugin may have a name and a type. The name uniquely identifies each plugin, while the type groups related plugins together. The type also corresponds to the list of tasks the plugin is capable of handling.

Referring to FIG. 15, two tasks 1502, 1504 being consumed by provisioners 1530A, 15306 are shown. Provisioner 1530A and provisioner 15306 are instances of the same provisioner. Provisioner 1530A receives node level task 1502 and provisioner 15306 receives node level task 1504. Each provisioner 1530A-1530B includes all of the plugins that might be needed for any task associated with a cluster management operation for a tenant. In the illustrated example, each provisioner includes a provider plugin 1514 for the cloud provider Rackspace and a provider plugin 1516 for the cloud provider Joyent. Each provisioner additionally includes an automator plugin 1518 for the Chef application and an automator plugin 1520 for the Shell application. However, other applications than Chef may also be used.

The provisioners 1530A-1530B each invoke an appropriate plugin to perform the received node level task. When a task 1502, 1504 is received, the provisioner 1530A, 15306 first determines from the taskName which type of plugin is required to handle the task. In the first example, task 1502 includes a "CREATE" taskName 1506, which indicates that the task should be handled by a provider plugin. Provisioner 1530A then checks the task (e.g., a task JSON) for the providertype field to determine which plugin to invoke. The determined provider type 1510 in the example is Rackspace, and so provider plugin 1514 is invoked and used to interface with the Rackspace API 1530. In the second example, task 1504 includes an "INSTALL" taskName 1508, which indicates the task should be handled by an automator plugin. Provisioner 15306 then checks the task (e.g., the task JSON) for the service action type field to determine which plugin to invoke. The determined provider type 1512 in the example is Chef, and so automator plugin 1518 is invoked and used to interface with the Chef application to install the Chef service on the node 1532. Alternatively, other services than the Chef service may be used.

In one embodiment, each plugin provides a descriptor file in which it declares its name, type, and execution class. Upon startup, the provisioner may scan its own directories looking for these descriptor files. Upon successful verification, the plugin is considered registered.

In one embodiment, a plugin can contain any arbitrary data it uses to perform its tasks. For example, a provider plugin may store API credentials locally, or a Chef plugin may keep a local repository of cookbooks. This data can be packaged with and considered as part of the plugin. Alternatively, API credentials and other arbitrary data that a plugin might use to perform its tasks may be managed centrally by the server. The server may manage such data per tenant, and distribute data for a tenant to appropriate provisioners associated with that tenant. A plugin may also specify certain configuration parameters that it expects to be filled in by users (e.g., through a user interface). For example, there are variances among cloud providers regarding the credentials needed to access their API. Some require a password, some require a key on disk, etc. The provisioner allows a plugin to specify the necessary configuration fields, so that an admin can simply fill in the values. Then, when a task is received by that particular plugin, it will have the key-value pairs it expects.

This plugin model is useful for supporting many providers and custom installation procedures. It makes it easy to leverage existing provider plugins or community code as plugins within the provisioners.

Figure 16:
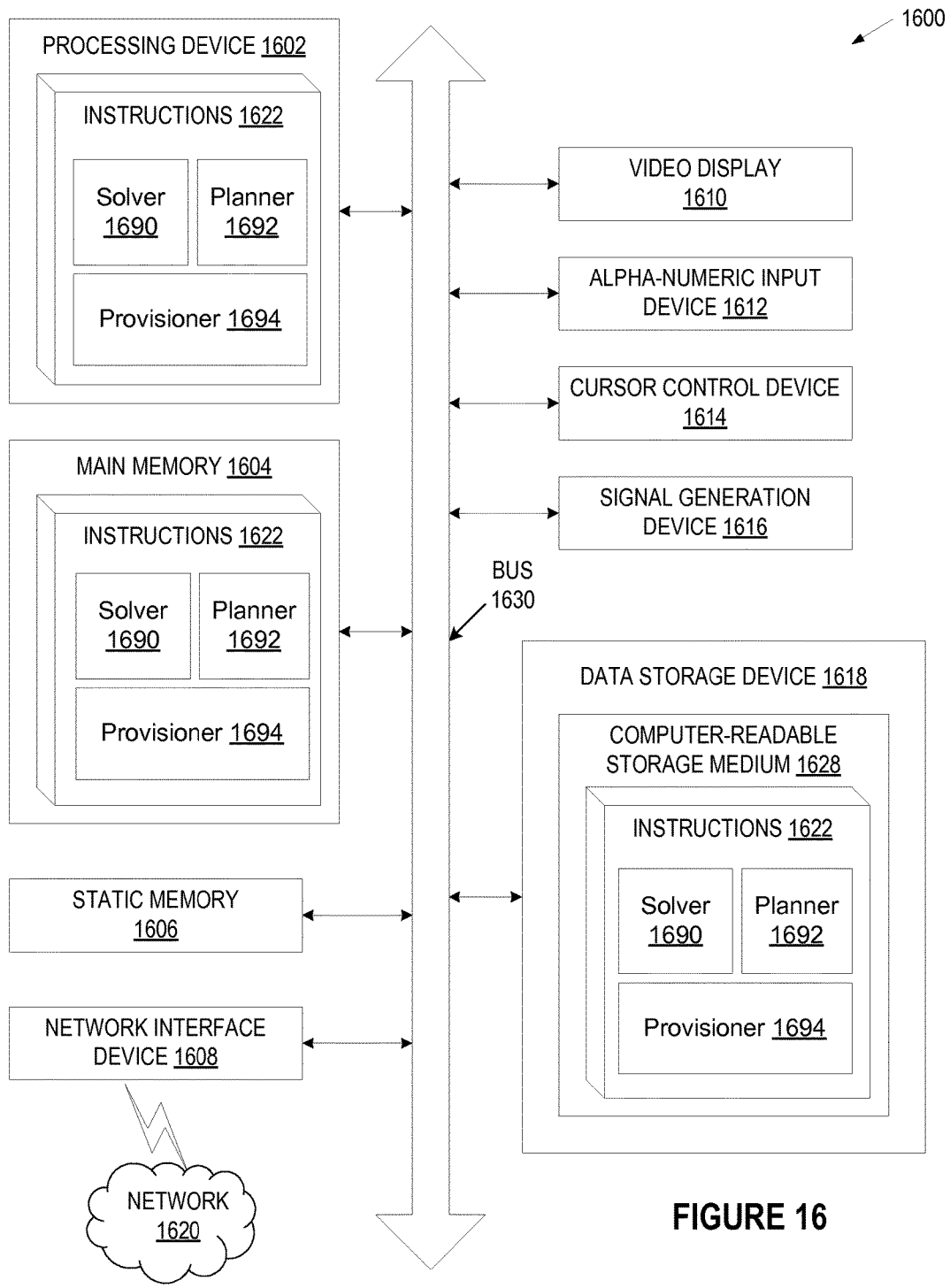
FIG. 16 illustrates a diagrammatic representation of a machine in the example form of a computing device within which a set of instructions, for causing the machine to perform any one or more of the methodologies discussed herein, may be executed.

FIG. 16 illustrates a diagrammatic representation of a machine in the example form of a computing device 1600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In embodiment, computing device 1600 corresponds to server computing device 105 of FIG. 1.

The example computing device 1600 includes a processing device 1602, a main memory 1604 (e.g., read-only memory (ROM), flash memory, dynamic random access memory (DRAM) such as synchronous DRAM (SDRAM) or Rambus DRAM (RDRAM), etc.), a static memory 1606 (e.g., flash memory, static random access memory (SRAM), etc.), and a secondary memory (e.g., a data storage device 1618), which communicate with each other via a bus 1630.

Processing device 1602 represents one or more general-purpose processors such as a microprocessor, central processing unit, or the like. More particularly, the processing device 1602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. Processing device 1602 is configured to execute the processing logic (instructions 1622) for performing the operations discussed herein.

The computing device 1600 may further include a network interface device 1608. The computing device 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1616 (e.g., a speaker).

The data storage device 1618 may include a machine-readable storage medium (or more specifically a computer-readable storage medium) 1628 on which is stored one or more sets of instructions 1622 embodying any one or more of the methodologies or functions described herein. The instructions 1622 may also reside, completely or at least partially, within the main memory 1604 and/or within the processing device 1602 during execution thereof by the computer system 1600, the main memory 1604 and the processing device 1602 also constituting computer-readable storage media.

The computer-readable storage medium 1628 may be used to store instructions 1622 for a solver 1690, a planner 1692, a provisioner 1694, etc. and/or a software library containing methods that call such a solver 1690, planner 1692 and/or provisioner 1694. While the computer-readable storage medium 1628 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, the non-transitory media including solid-state memories, and optical and magnetic media.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "solving", "outputting", "creating", "requesting", "performing", "reporting" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, or other type of machine-accessible storage media.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving a first cluster management operation request, the first cluster management operation request being for a deployment operation of a first cluster and indicating a specified number of nodes and a cluster template, the cluster template being absent a cluster layout and comprising a plurality of constraints for determining a cluster layout;
   deterministically solving, by a processing device, for a first cluster layout comprising the specified number of nodes, each of the specified number of nodes comprising a hardware type, an image type and one or more services, wherein the first cluster layout satisfies the plurality of constraints, and wherein the plurality of constraints specifies one or more hardware types for a node for each corresponding service of the one or more services that is installed on the node and one or more image types for the node for each corresponding service that is installed on the node;
   outputting the first cluster layout; and
   automatically deploying the first cluster in accordance with the first cluster layout.

2. The method of claim 1, wherein:
   a first constraint of the plurality of constraints defines, for a first service of the one or more services, one or more hardware types required for a node on which the first service is to be installed, one or more image types required for the node on which the first service is to be installed, and a quantity of instances of the first service to be deployed in the first cluster; and
   a second constraint of the plurality of constraints defines, for the first service, at a third service that cannot coexist on the same node as the first service.

3. The method of claim 2, wherein at least one of the one or more hardware types comprises a first hardware definition associated with a first provider and a second hardware definition associated with a second provider, and wherein the first hardware definition is used for a first node if the first provider is used to create the first node having the hardware type and the second hardware definition is used for the first node if the second provider is used to create the first node having the hardware type.

4. The method of claim 1, further comprising:
   receiving a second cluster management operation request to modify the first cluster, the second cluster management request comprising at least one of a modified cluster template or a different specified number of nodes;
   determining whether the second cluster management operation will cause the first cluster layout to be modified; and
   responsive to determining that the second cluster management operation will not cause the first cluster layout to be modified, performing the second cluster management operation without solving for a new cluster layout.

5. The method of claim 4, further comprising performing the following responsive to determining that the second cluster management operation will cause the first cluster to deviate from the first cluster layout:
   determining a new plurality of constraints from at least one of the cluster template or the modified cluster template;
   defining a plurality of additional constraints from the first cluster layout;
   deterministically solving for the new cluster layout, wherein the new cluster layout comprises the specified number of nodes or the different specified number of nodes, and wherein the new cluster layout satisfies the new plurality of constraints and the additional constraints; and
   outputting the new cluster layout, wherein the first cluster is automatically updated in accordance with the new cluster layout.

6. The method of claim 1, wherein deterministically solving for the first cluster layout comprises:

determining one or more valid service sets, each of the one or more valid service sets comprising one or more services that are permitted to be deployed together on a same node;

determining one or more valid node layouts using the one or more valid service sets, each of the one or more valid node layouts comprising a particular hardware type, a particular image type and a valid service set that is permitted to be deployed on a node having the particular hardware type and the particular image type; and determining a combination of the one or more valid node layouts that satisfies the plurality of constraints and includes the specified number of nodes.

7. The method of claim 6, wherein deterministically solving for the first cluster layout further comprises:

deterministically selecting the one or more valid node layouts to include in the combination based on at least one of a preferred image type or a preferred hardware type.

8. The method of claim 1, wherein the first cluster is associated with a first tenant, the method further comprising:

receiving a second cluster management operation request to deploy or modify a second cluster associated with a second tenant, the second cluster management operation request comprising a second cluster template and a second specified number of nodes to deploy, wherein the first cluster template is not viewable by the second tenant and the second cluster template is not viewable by the first tenant; and solving for a second cluster layout for the second cluster, wherein the first cluster and the first cluster layout are not viewable by the second tenant and the second cluster and the second cluster layout are not viewable by the first tenant.

9. A non-transitory computer readable storage medium comprising instructions that, when executed by a processing device, cause the processing device to perform operations comprising:

receiving a first cluster management operation request, the first cluster management operation request being for a deployment operation of a first cluster and indicating a specified number of nodes and a cluster template, the cluster template being absent a cluster layout and comprising a plurality of constraints for determining a cluster layout;

deterministically solving, by the processing device, for a first cluster layout comprising the specified number of nodes, each of the specified number of nodes comprising a hardware type, an image type and one or more services, wherein the first cluster layout satisfies the plurality of constraints, and wherein the plurality of constraints specifies one or more hardware types for a node for each corresponding service of the one or more services that is installed on the node and one or more image types for the node for each corresponding service that is installed on the node;

outputting the first cluster layout; and automatically deploying the first cluster in accordance with the first cluster layout.

10. The non-transitory computer readable storage medium of claim 9, wherein:

a first constraint of the plurality of constraints defines, for a first service of the one or more services, one or more hardware types required for a node on which the first service is to be installed, one or more image types required for the node on which the first service is to be installed, and a quantity of instances of the first service to be deployed in the first cluster; and a second constraint of the plurality of constraints defines, for the first service, at a third service that cannot coexist on the same node as the first service.

11. The non-transitory computer readable storage medium of claim 10, wherein the first constraint further defines at least one of a first ratio indicating a minimum percentage of nodes in the cluster layout on which the first service must be installed or a second ratio indicating a maximum percentage of the nodes in the cluster layout on which the first service is allowed to be installed.

12. The non-transitory computer readable storage medium of claim 9, the operations further comprising:

receiving a second cluster management operation request to modify the first cluster, the second cluster management request comprising at least one of a modified cluster template, a different specified number of nodes or a different configuration;

determining whether the second cluster management operation will cause the first cluster to deviate from the first cluster layout; and responsive to determining that the second cluster management operation will not cause the first cluster to deviate from the first cluster layout, performing the second cluster management operation without solving for a new cluster layout.

13. The non-transitory computer readable storage medium of claim 12, the operations further comprising performing the following responsive to determining that the second cluster management operation will cause the first cluster to deviate from the first cluster layout:

determining a new plurality of constraints from at least one of the cluster template, the modified cluster template or the different configuration;

defining a plurality of additional constraints from the first cluster layout;

deterministically solving for the new cluster layout, wherein the new cluster layout comprises the specified number of nodes or the different specified number of nodes, and wherein the new cluster layout satisfies the new plurality of constraints and the additional constraints; and outputting the new cluster layout, wherein the first cluster is automatically updated in accordance with the new cluster layout.

14. The non-transitory computer readable storage medium of claim 9, wherein deterministically solving for the first cluster layout comprises:

determining one or more valid service sets, each of the one or more valid service sets comprising one or more services that are permitted to be deployed together on a same node;

determining one or more valid node layouts using the one or more valid service sets, each of the one or more valid node layouts comprising a particular hardware type, a particular image type and a valid service set that is permitted to be deployed on a node having the particular hardware type and the particular image type; and determining a combination of the one or more valid node layouts that satisfies the plurality of constraints and includes the specified number of nodes.

15. The non-transitory computer readable storage medium of claim 14, wherein deterministically solving for the first cluster layout further comprises:

deterministically selecting the one or more valid node layouts to include in the combination based on at least one of a preferred image type or a preferred hardware type.

16. The non-transitory computer readable storage medium of claim 9, wherein the first cluster is associated with a first tenant, the operations further comprising:
receiving a second cluster management operation request to deploy or modify a second cluster associated with a second tenant, the second cluster management operation request comprising a second cluster template, a second specified number of nodes to deploy and a configuration, wherein the first cluster template is not viewable by the second tenant and the second cluster template is not viewable by the first tenant; and solving for a second cluster layout for the second cluster, wherein the first cluster and the first cluster layout are not viewable by the second tenant and the second cluster and the second cluster layout are not viewable by the first tenant.

17. A computing device comprising:
a memory; and
a processing device coupled to the memory, the processing device to:
receive a first cluster management operation request, the first cluster management operation request being for a deployment operation of a first cluster and indicating a specified number of nodes and a cluster template, the cluster template being absent a cluster layout and comprising a plurality of constraints for determining a cluster layout;
deterministically solve for a first cluster layout comprising the specified number of nodes, each of the specified number of nodes comprising a hardware type, an image type and one or more services, wherein the first cluster layout satisfies the plurality of constraints, and wherein the plurality of constraints specifies one or more hardware types for a node for each corresponding service of the one or more services that is installed on the node and one or more image types for the node for each corresponding service that is installed on the node;
output the first cluster layout; and
automatically deploying the first cluster in accordance with the first cluster layout.

18. The computing device of claim 17, wherein a first constraint of the plurality of constraints defines, for a first service of the one or more services:
one or more hardware types required for a node on which the first service is to be installed;
one or more image types required for the node on which the first service is to be installed;
a quantity of instances of the first service to be deployed in the first cluster; and at least one of a first ratio indicating a minimum percentage of nodes in the cluster layout on which the first service must be installed or a second ratio indicating a maximum percentage of the nodes in the cluster layout on which the first service is allowed to be installed.

19. The computing device of claim 17, wherein the processing device is further to:
receive a second cluster management operation request to modify the first cluster, the second cluster management request comprising at least one of a modified cluster template, a different specified number of nodes or a particular configuration;
determine whether the second cluster management operation will cause the first cluster to deviate from the first cluster layout; and
responsive to determining that the second cluster management operation will not cause the first cluster to deviate from the first cluster layout, perform the second cluster management operation without solving for a new cluster layout.

20. The computing device of claim 19, wherein the processing device is further to perform the following responsive to determining that the second cluster management operation will cause the first cluster to deviate from the first cluster layout:
determine a new plurality of constraints from at least one of the cluster template or the modified cluster template;
define a plurality of additional constraints from the first cluster layout;
deterministically solve for the new cluster layout, wherein the new cluster layout comprises the specified number of nodes or the different specified number of nodes, and wherein the new cluster layout satisfies the new plurality of constraints and the additional constraints; and
output the new cluster layout, wherein the first cluster is automatically updated in accordance with the new cluster layout.

21. The computing device of claim 17, wherein deterministically solving for the first cluster layout comprises:
determining one or more valid service sets, each of the one or more valid service sets comprising one or more services that are permitted to be deployed together on a same node;
determining one or more valid node layouts using the one or more valid service sets, each of the one or more valid node layouts comprising a particular hardware type, a particular image type and a valid service set that is permitted to be deployed on a node having the particular hardware type and the particular image type; and
determining a combination of the one or more valid node layouts that satisfies the plurality of constraints and includes the specified number of nodes.

* * * * *